(12) United States Patent
Xu et al.

(10) Patent No.: US 8,896,609 B2
(45) Date of Patent: Nov. 25, 2014

(54) VIDEO CONTENT GENERATION SYSTEM, VIDEO CONTENT GENERATION DEVICE, AND STORAGE MEDIA

(75) Inventors: Jianfeng Xu, Fujimino (JP); Koichi Takagi, Fujimino (JP); Ryouichi Kawada, Fujimino (JP)

(73) Assignee: KDDI Corporation, Tokyo (JP)

( * ) Notice: Subject to any disclaimer, the term of this patent is extended or adjusted under 35 U.S.C. 154(b) by 274 days.

(21) Appl. No.: 13/251,450

(22) Filed: Oct. 3, 2011

(65) Prior Publication Data

US 2012/0086855 A1    Apr. 12, 2012

(30) Foreign Application Priority Data

Oct. 7, 2010 (JP) ................................ 2010-227891

(51) Int. Cl.
*G06T 13/00* (2011.01)
*G06T 13/20* (2011.01)

(52) U.S. Cl.
CPC ................................... *G06T 13/205* (2013.01)
USPC ........................................................ 345/474

(58) Field of Classification Search
CPC ....... G06T 17/20; G06T 17/205; G06T 15/04; G06T 15/005; G06T 11/40; G06T 13/205; G06T 13/40; G10H 2220/101; G10H 1/40; G10H 2210/076
USPC ........................................................ 345/474
See application file for complete search history.

(56) References Cited

U.S. PATENT DOCUMENTS

| 2004/0163527 | A1 | 8/2004 | Kawai et al. | |
| 2005/0210255 | A1* | 9/2005 | Kirovski | 713/176 |
| 2009/0278846 | A1* | 11/2009 | Gulsun et al. | 345/423 |

FOREIGN PATENT DOCUMENTS

| JP | 2004-127019 A | 4/2004 |
| JP | 2005-056101 | 3/2005 |
| JP | 2007-018388 | 1/2007 |

OTHER PUBLICATIONS

Cormen et al., "Introduction to Algorithms, Second Edition", MIT Press and McGraw-Hili, (1990), ISBN 0-262-03141-8. Chapter 15, Dynamic Programming, pp. 323-369.*
Kim et al., "Rhythmic-Motion Syntheses Based on Motion-Beat Analysis", Korea Advanced Institute of Science and Technology, ACM Transaction on Graphics, vol. 22, Issue 3, 2003 (SIGGRAPH 2003), pp. 392-401.*
Xu et al., "Dance Generation Synchronized with Music using Motion Beat and Intensity", 2009 Video Media Processing Symposium (IMPS), I-4.01, Oct. 7-9, 2009.

(Continued)

*Primary Examiner* — Kee M Tung
*Assistant Examiner* — Haixia Du
(74) *Attorney, Agent, or Firm* — Morgan, Lewis & Bockius LLP

(57) ABSTRACT

A video content generation device generates video data synchronized with music data based on motion data, representing a motion graph including nodes, edges, and weights, and metadata indicating a synchronization probability per each node between the motion graph and a musical tune. A music data storage unit stores the predetermined amount of music data and their musical characteristics in connection with the predetermined number of beats, in a reproduction order, retrieved from the musical tune. An optimum path search unit searches an optimum path connecting between nodes, each of which is selected per each beat with a high synchronization probability, on the motion graph with motion characteristics matching with musical characteristics based on the predetermined amount of music data. Video data synchronized with music data is generated based on synchronization information for correlating motion data to music data along with the optimum path.

15 Claims, 13 Drawing Sheets

(56) References Cited

OTHER PUBLICATIONS

Goto, "An Audio-based Real-time Beat Tracking System for Music With or Without Drum-sounds", Journal of New Music Research, vol. 30, No. 2, pp. 159-171, 2001.

Kovar et al., "Motion Graphs", ACM Transaction on Graphics, vol. 21, Issue 3, 2002 (SIGGRAPH 2002), pp. 473-482.

Cormen et al., "Introduction to Algorithms, Second Edition", MIT Press and McGraw-Hill, (1990), ISBN 0-262-03141-8. Chapter 15, Dynamic Programming, pp. 323-369.

Xu et al., "Automatic Composition of Motion Capture Animation for Music Synchronization", EUROGRAPHICS Digital Library, 2010.

Notice of Allowance dated May 20, 2014, issued by the Japanese Patent Office in Japanese Patent Application No. 2010-227891.

* cited by examiner

FIG. 10

| Right and Left Hip | 1.0000 |
|---|---|
| Right and Left Knee | 0.0901 |
| Right and Left Shoulder | 0.7884 |
| Right and Left Elbow | 0.0247 |

VIDEO CONTENT GENERATION SYSTEM, VIDEO CONTENT GENERATION DEVICE, AND STORAGE MEDIA

BACKGROUND OF THE INVENTION

1. Field of the Invention

The present invention relates to video content generation systems, video content generation devices, and storage media with respect to video contents such as motion capture data synchronized with music data.

The present application claims priority on Japanese Patent Application No. 2010-227891, the content of which is incorporated herein by reference.

2. Description of the Related Art

Recently, various technologies for displaying computer graphics (CG) objects synchronized with music data have been developed, wherein computer graphics models are moved in accordance with predetermined mapping patterns of music when musicians play music.

Patent Document 1 discloses that rendering information (e.g. viewpoint information, light source information) is reassigned to time series of CG objects based on static attributes or dynamic attributes of music data, wherein music data are reproduced in synchronization with CG objects displayed on screen. Patent Document 2 discloses a motion generation device in which a motion database stores digraphs each connecting two frames with a similar human posture among a plurality of motions, thus selecting motions with motion characteristics correlated to beat characteristics extracted from music data. Non-Patent Document 1 discloses a unique data structure which is generated in advance so as to establish high-speed synchronization with input music by way of dynamic programming.

Non-Patent Document 2 discloses a music analysis method, which retrieves a beat interval and a beat structure by estimating changes of chords, timings of generating percussion sounds, or the like. Non-Patent Document 3 discloses a motion analysis method, which retrieves a beat interval and a beat structure by estimating changes of motion beats, timings of generating motion beats, or the like. Non-Patent Document 4 discloses a technology for generating new motion data using motion graphs. Non-Patent Document 5 discloses a technology for searching optimum paths, derived from a certain start point, by way of dynamic programming.

Patent Document 1 may undergo a difficulty in creating CG animations suited to musical tunes if time series of CG objects are not suited to musical variations in musical tunes. Patent Document 2 may undergo a difficulty in creating practical motion databases for storing digraphs each connecting two frames with a similarity of human posture among enormous amounts of motion data which are generally available. For this reason, it is preferable to connect motion data among the limited number of motion data which are selected based on a specific musical tune actually subjected to motion creation processing.

Patent Document 4 needs enormous calculations in creating motion graphs and in searching optimum paths. Original motion structures are likely to be destroyed by use of motion graphs which are not created in consideration of original motion structures. For instance, abrupt changes of motions, during transition between intense motions and slow motions, may cause artificial motions or incoherent motions.

Non-Patent Document 1 may undergo a difficulty in creating CG objects synchronized with music data without inputting the entirety of each musical tune from its beginning to ending. For this reason, it is difficult to generate CG animations in real time in synchronization with a musical tune transmitted via streaming distribution.

PRIOR ART DOCUMENT

Patent Documents

Patent Document 1: Japanese Patent Application Publication No. 2005-56101
Patent Document 2: Japanese Patent Application Publication No. 2007-18388

Non-Patent Documents

Non-Patent Document 1: Jianfeng Xu, Koichi Takagi, Akio Yoneyama, "Dance Generation Synchronized with Music using Motion Beat and Intensity", 2009 Image Media Processing Symposium (IMPS), I-4.01, Oct. 7, 2009
Non-Patent Document 2: Masataka Goto, "An Audio-based Real-time Beat Tracking System for Music With or Without Drum-sounds", Journal of New Music Research, Vol. 30, No. 2, pp. 159-171, 2001
Non-Patent Document 3: Tae-hoon Kim, Sang II Park, Sung Yong Shin, "Rhythmic-Motion Synthesis Based on Motion-Beat Analysis", ACM Transaction on Graphics, Vol. 22, Issue 3, 2003 (SIGGRAPH 2003), pp. 392-401
Non-Patent Document 4: Lucas Kovar, Michael Gleicher, and Frédéric Pighin, "Motion Graphs", ACM Transaction on Graphics, Vol. 21, Issue 3, 2002 (SIGGRAPH 2002), pp. 473-482
Non-Patent Document 5: Thomas H. Cormen; Charles E. Leiserson, Ronald L. Rivest, Clifford Stein (1990): "Introduction to Algorithms, Second Edition", MIT Press and McGraw-Hill. ISBN 0-262-03141-8. pp. 323-69

SUMMARY OF THE INVENTION

It is an object of the present invention to provide a video content generation system and a video content generation device, which are able to generate video contents synchronized with music data in association with a large-scale motion database without inputting the entirety of each musical tune from its beginning to ending.

It is another object of the present invention to provide a storage media for storing a computer-readable program causing a computer to generate video contents synchronized with music data.

In a first aspect of the present invention, a video content generation system includes a storage unit which stores a motion graph including nodes, edges, and weights, which are calculated based on motion characteristics extracted from motion data, as well as metadata indicating a synchronization probability per each node between the motion graph and a musical tune used for generating video content; a music data storage unit which retrieves the predetermined number of beats, in a reproduction order, from the musical tune so as to store the predetermined amount of music data with their musical features; an optimum path search unit that searches an optimum path connecting between nodes, each of which is selected per each beat with a high synchronization probability, on the motion graph with motion characteristics matching with musical characteristics based on the predetermined amount of music data; a synchronization unit which generates synchronization information for correlating music data to motion data along with the optimum path; and a video data generation unit which generates video data synchronized with music data based on the synchronization information, thus simultaneously reproducing video data and music data.

The video content generation system further includes a motion graph creation unit which creates a motion graph including nodes, edges, and weights based on motion characteristics of motion data; a metadata creation unit which creates metadata indicating the synchronization probability with the musical tune per each node of the motion graph; and a music analysis unit which retrieves musical features from music data stored in the music data storage unit.

The video content generation system further includes a weight calculation unit which calculates a weight based on the number of nodes subsequently connectible to each of nodes included in the motion graph that includes a plurality of nodes in frames with motion characteristics extracted from motion data and a plurality of edges each indicating concatenation between adjacent nodes.

The weight calculation unit discriminates a first type of nodes each subsequently connectible to none of nodes and a second type of nodes each subsequently connectible to multiple nodes, thus estimating the weight with respect to each of nodes in response to the first type or the second type.

The optimum path search unit searches the optimum path connecting between nodes with motion characteristics matching with musical characteristics of music data such that the weight of a last node is above a predetermined value.

When the music data storage unit newly stores the predetermined number of beats of music data, the optimum path search unit searches a new optimum path in response to a ratio between a first cost, calculated between the last node of the foregoing optimum path and a newly added node corresponding to the newly stored music data, and a second cost calculated between a candidate of the last node of the foregoing optimum path and the newly added node, wherein the new optimum path is made by adding concatenation between the last node and the newly added node to the foregoing optimum path.

In the above, when the first cost is higher than the second cost multiplied by a predetermined coefficient, the optimum path search unit searches the new optimum path based on the predetermined amount of music data stored in the music data storage unit, otherwise, the optimum path search unit adds concatenation between the last node and the newly added node to the foregoing optimum path.

The video content generation system further includes a transposition determination unit which analyzes musical characteristics from music data stored in the music data storage unit so as to determine the predetermined number of beats.

The transposition determination unit increases the predetermined number of beats owing to a change of a musical phase or a climax of the musical tune based on music data stored in the music data storage unit, otherwise, the transposition determination unit sets one beat as the predetermined number of beats.

In a second aspect of the present invention, a video content generation device includes a capture unit which captures a motion graph including nodes, edges, and weights, which are calculated based on motion characteristics extracted from motion data, as well as metadata indicating a synchronization probability per each node between the motion graph and a musical tune used for generating video content; a music data storage unit which retrieves the predetermined number of beats, in a reproduction order, from the musical tune so as to store the predetermined amount of music data with their musical features; an optimum path search unit that searches an optimum path connecting between nodes, each of which is selected per each beat with a high synchronization probability, on the motion graph with motion characteristics matching with musical characteristics based on the predetermined amount of music data; a synchronization unit which generates synchronization information for correlating music data to motion data along with the optimum path; and a video data generation unit which generates video data synchronized with music data based on the synchronization information, thus simultaneously reproducing video data and music data.

The video content generation device further includes a music analysis unit which retrieves musical characteristics from the predetermined amount of music data stored in the music data storage unit.

The capture unit calculates a weight based on the number of nodes subsequently connectible to each of nodes included in the motion graph that includes a plurality of nodes in frames with motion characteristics extracted from motion data and a plurality of edges each indicating concatenation between adjacent nodes, wherein the optimum path search unit searches the optimum path connecting between nodes with motion characteristics matching with musical characteristics of music data on the motion graph such that the weight of the last node is above the predetermined value.

When the music data storage unit newly stores the predetermined number of beats of music data, the optimum path search unit searches a new optimum path in response to a ratio between a first cost, calculated between the last node of the foregoing optimum path and a newly added node corresponding to the newly stored music data, and a second cost calculated between a candidate of the last node of the foregoing optimum path and the newly added node, wherein the new optimum path is made by adding concatenation between the last node and the newly added node to the foregoing optimum path.

When the first cost is higher than the second cost multiplied by a predetermined coefficient, the optimum path search unit searches the new optimum path based on the predetermined amount of music data stored in the music data storage unit, otherwise, the optimum path search unit adds concatenation between the last node and the newly added node to the foregoing optimum path.

The video content generation device further includes a transposition determination unit which analyzes musical characteristics from music data stored in the music data storage unit so as to determine the predetermined number of beats.

The transposition determination unit increases the predetermined number of beats owing to a change of a musical phase or a climax of the musical tune based on music data stored in the music data storage unit, otherwise, the transposition determination unit sets one beat as the predetermined number of beats.

In a third aspect of the present invention, a computer-readable storage medium causing a computer to execute a video content generation method comprises: a capture step for capturing a motion graph including nodes, edges, and weights, which are calculated based on motion characteristics extracted from motion data, as well as metadata indicating a synchronization probability per each node between the motion graph and a musical tune used for generating video content; a music data storing step for retrieving the predetermined number of beats, in a reproduction order, from the musical tune so as to store the predetermined amount of music data with their musical features; an optimum path searching step for searching an optimum path connecting between nodes, each of which is selected per each beat with a high synchronization probability, on the motion graph with motion characteristics matching with musical characteristics based on the predetermined amount of music data; a synchronization step for generating synchronization information for correlating music data to motion data along with the optimum path; and a video data generating step for generating video data synchronized with music data based on the synchronization information, thus simultaneously reproducing video data and music data.

The video content generation method further includes a music analysis step for retrieving musical characteristics from the predetermined amount of music data stored in the music data storing step.

The capture step calculates a weight based on the number of nodes subsequently connectible to each of nodes included in the motion graph that includes a plurality of nodes in frames with motion characteristics extracted from motion data and a plurality of edges each indicating concatenation between adjacent nodes, whilst the optimum path searching step searches the optimum path connecting between nodes with motion characteristics matching with musical characteristics of music data on the motion graph such that the weight of the last node is above the predetermined value.

When the predetermined number of beats of music data is newly stored, the optimum path searching step searches a new optimum path in response to a ratio between a first cost, calculated between the last node of the foregoing optimum path and a newly added node corresponding to the newly stored music data, and a second cost calculated between a candidate of the last node of the foregoing optimum path and the newly added node. The new optimum path is made by adding concatenation between the last node and the newly added node to the foregoing optimum path.

The present invention is able to generate video contents synchronized with music by use of a large-scale motion database without inputting a complete set of music data representing each musical tune from the beginning to the ending.

BRIEF DESCRIPTION OF THE DRAWINGS

These and other objects, aspects, and embodiments of the present invention will be described in more detail with reference to the following drawings.

FIG. 10 shows exemplary values of weights which are determined in advance with respect to joints.

DESCRIPTION OF THE PREFERRED EMBODIMENT

The present invention will be described in further detail by way of examples with reference to the accompanying drawings.

Figure 1:
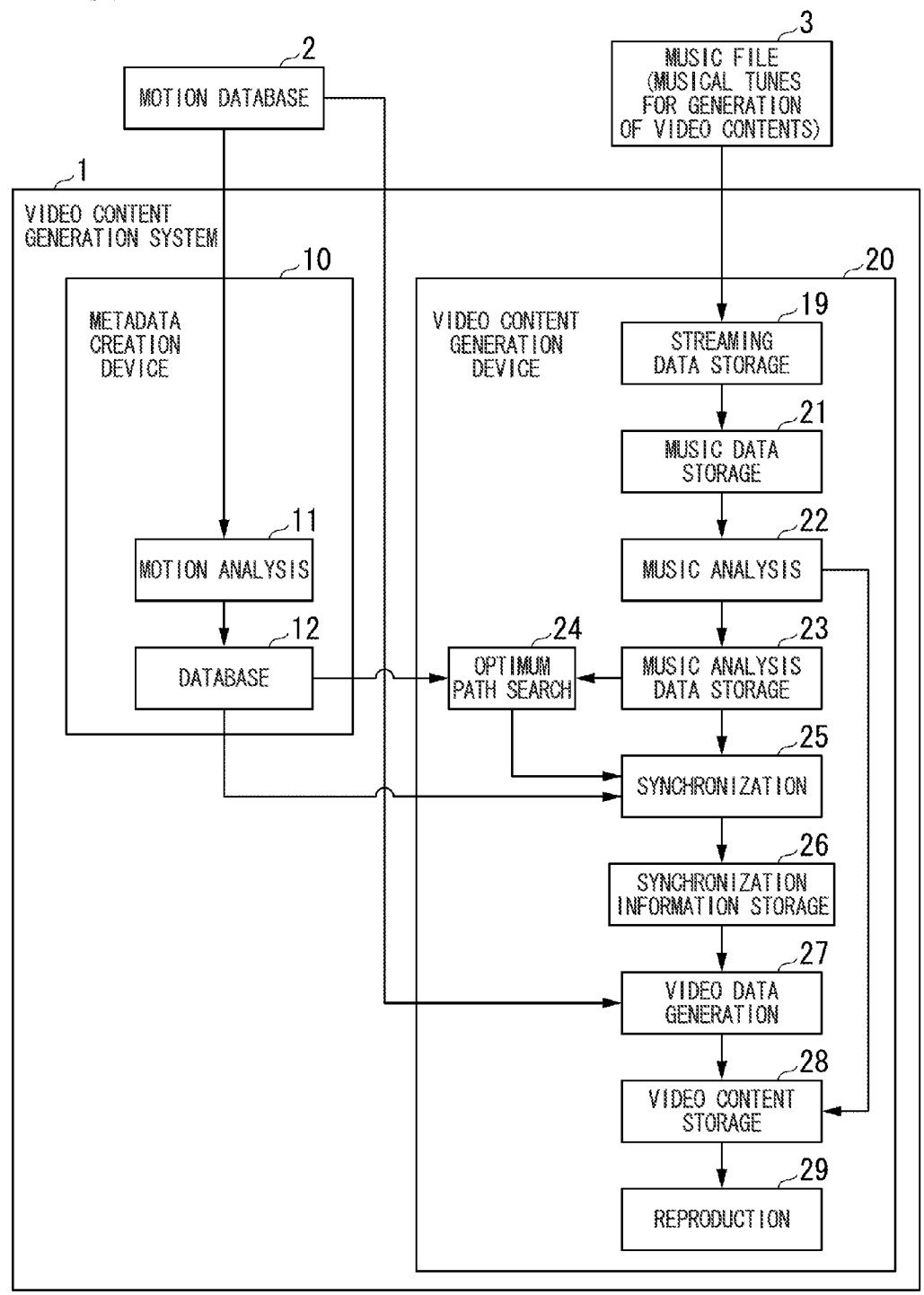
FIG. 1 is a block diagram of a video content generation system, including a metal data creation device and a video content generation device, according to a preferred embodiment of the present invention.

FIG. 1 is a block diagram of a video content generation system 1 according to a preferred embodiment of the present invention. The video content generation system 1 of FIG. 1 includes a metadata creation device 10 and a video content generation device 20. The metadata creation device 10 is connected to a network (not shown) which is able to communicate with the video content generation device 20, thus enabling mutual communication between the metadata creation device 10 and the video content generation device 20. The metadata creation device 10 includes a motion analysis unit 11 and a database 12. The video content generation device 20 includes a streaming data storage unit 19, a music data storage unit 21, a music analysis unit 22, a music analysis data storage unit 23, an optimum path search unit 24, a synchronization unit 25, a synchronization information storage unit 26, a video data generation unit 27, a video content storage unit 28, and a reproduction unit 29.

The video content generation device 20 receives music data, representing musical tunes used for generation of video contents, from a music file 3 by way of streaming distribution.

A motion database 2 accumulates a great number of motion data (e.g. motion capture data suitable to video contents), which are generally available. The metadata creation device 10 and the video content generation device 20 input motion data from the motion database 2. The present embodiment is designed to handle human motion data, in particular human skeleton motion data whose definition is shown in FIG. 2.

Figure 2:
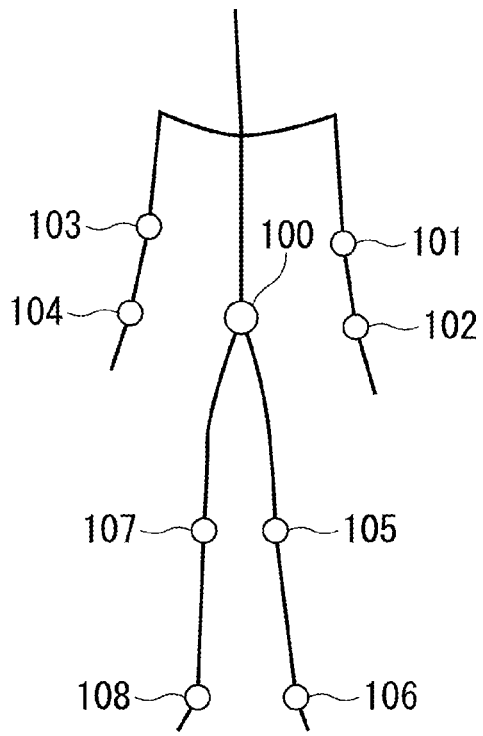
FIG. 2 is a schematic illustration indicating the definition of human skeleton motion data.

FIG. 2 is a schematic illustration showing the definition of human motion data, in particular the definition of human skeleton motion data. Human skeleton motion data is created based on a human skeleton using conjunction points (i.e.

joints) between bones, wherein a principal joint is called a root, so that a bone structure is defined as a tree structure in which bones are connected via joints derived from the root.

FIG. 2 shows a part of a definition of human skeleton motion data, in which a joint 100 indicating a waist is defined as a root. Specifically, a joint 101 indicates an elbow of a left arm; a joint 102 indicates a wrist of a left arm; a joint 103 indicates an elbow of a right arm; a joint 104 indicates a wrist of a right arm; a joint 105 indicates a knee of a left leg; a joint 106 indicates an ankle of a left leg; a joint 107 indicates a knee of a right leg; and a joint 108 indicates an ankle of a right leg.

Skeleton motion data are defined as data describing motions of joints constituting a skeleton of a subject, e.g. a human body, an animal, a robot, or the like. Skeleton motion data may embrace position information, angle information, velocity information, and acceleration information with respect to joints. The following description refers to selected pieces of information as human skeleton motion data, e.g. angle information and acceleration information representative of a human skeleton.

Human skeleton angle information construes a series of human motions as a sequence of poses, so that human skeleton angle information includes neutral pose data representing a neutral pose of a human body and frame data each representing each of poses in an actual human motion. Neutral pose data includes the position of a root, the position of each joint, and the length of each bone. Neutral pose data specifies a neutral pose of a human body. Frame data indicates displacement per each joint deviated from its original position defined in the neutral pose. Herein, angle information is adopted to indicate displacement. Each frame data specifies each pose in which prescribed displacements are applied to the neutral pose. A sequence of poses specified by frame data is used to specify a sequence of human motions. Human skeleton angle information may be created by way of motion capture processing on videos produced by a camera taking images of human motions. Alternatively, human skeleton angle information may be created by key frame animation handwork.

Human skeleton acceleration information construes accelerations of joints of a human body as a sequence of poses incorporating frame data per each pose. Human skeleton velocity information can be recorded using an accelerometer, or it can be calculated based on video and motion data.

For the sake of convenience, human skeleton motion data will be simply referred to as "motion data".

Next, constituent elements of the metadata creation device 10, included in the video content generation system 1 shown in FIG. 1, will be described in detail.

1. Motion Analysis Unit

The motion analysis unit 11 retrieves motion data from the motion database 2, analyzes retrieved motion data, detects motion characteristics, and stores motion characteristic in the database 12. The motion analysis unit 11 covers all the motion data accumulated in the motion database 2. The processing of the motion analysis unit 11 is carried out as a preparation stage before actual generation of video contents.

Figure 3:
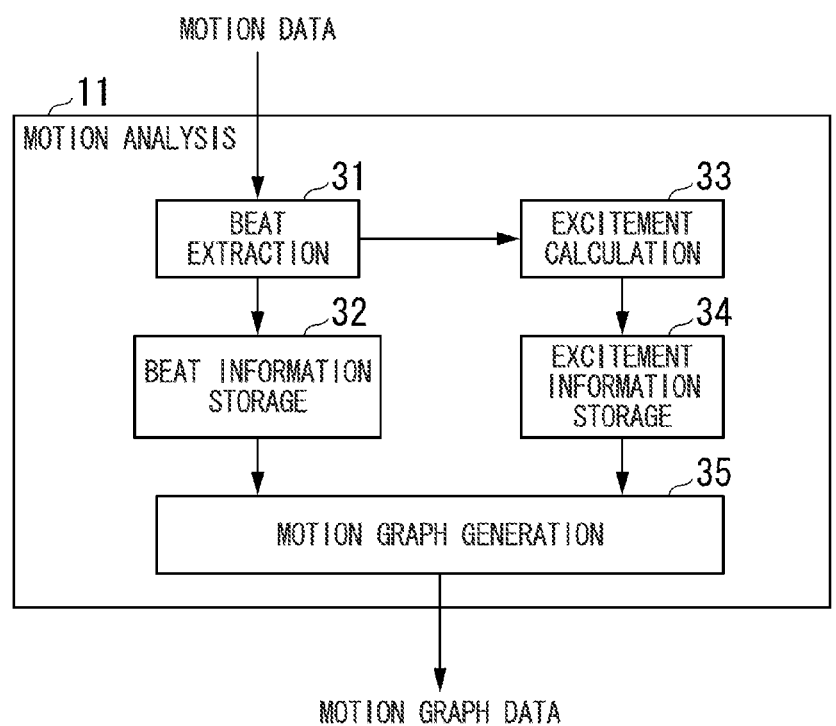
FIG. 3 is a block diagram of a motion analysis unit included in the metadata creation device of the video content generation system shown in FIG. 1.

FIG. 3 is a block diagram of the motion analysis unit 11 shown in FIG. 1. As shown in FIG. 3, the motion analysis unit 11 includes a beat extraction unit 31, a beat information storage unit 32, an excitement calculation unit 33, an excitement information storage unit 34, and a motion graph generation unit 35. In the present embodiment, the motion graph generation unit 35 implements the functionality regarding a motion graph creation part and a metadata creating part.

2. Beat Extraction Part

The beat extraction unit 31 detects beat timings based on input motion data. Herein, beat timings of motion data are defined as timings undergoing variations in the direction and intensity of repetitive motion.

In the case of dance motion, for example, beat timings indicate timings of beats in a rhythm. The beat extraction unit 31 divides input motion data into short-time motion data in connection with motion divisions (i.e. intervals of divided motions), thus detecting beat timings by way of principal component analysis.

Next, a beat timing detection process of the beat extraction unit 31 will be described below.

Figure 4:
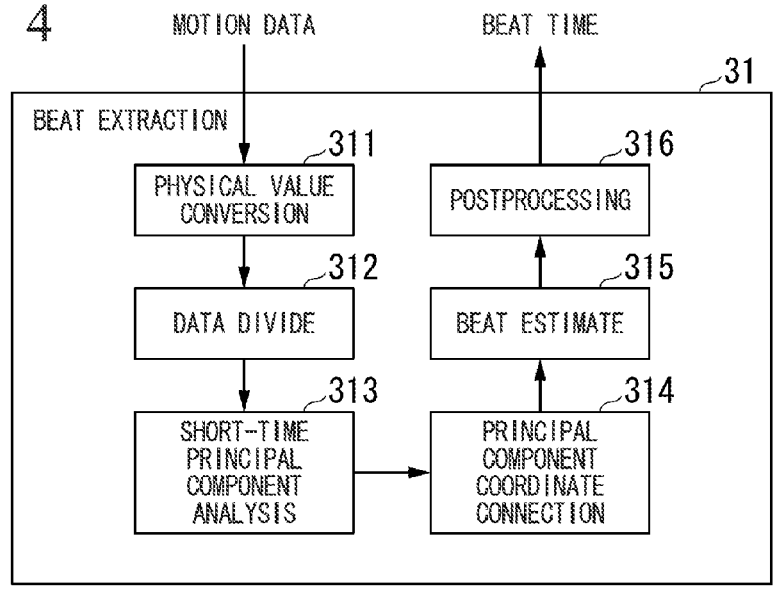
FIG. 4 is a block diagram of a beat extraction unit included in the motion analysis unit shown in FIG. 3.

FIG. 4 is a block diagram showing the detailed constitution of the beat extraction unit 31 shown in FIG. 3. As shown in FIG. 4, the beat extraction unit 31 includes a physical value conversion part 311, a data divide part 312, a short-time principal component analysis part 313, a principal component coordinate connection part 314, a beat estimate part 315, and a postprocessing part 316.

3. Physical Value Conversion

The physical value conversion part 311 calculates relative positions of joints at time t based on input motion data. Relative positions of joints are positions of joints relative to the root.

A calculation method for calculating relative positions of joints will be described below.

Positions of joints are calculated using neutral pose data and frame data within human skeleton angle information. Neutral pose data includes various pieces of information specifying the neutral pose, e.g. the position of the root and the position of each joint in the neutral pose as well as the lengths of bones.

Frame data indicates a displacement per each joint deviated from the neutral pose, wherein the displacement is indicated by angle information. At time t, a position $p^k(t)$ of a joint k is calculated in accordance with Equations (1) and (2), wherein $p^k(t)$ indicate three-dimensional coordinates, and time t indicates the timing of each frame data. The present embodiment deals with time t as a "frame index", wherein t is set to 0, 1, 2, ..., T−1 where T denotes the number of frames included in motion data.

$$p^k(t) = \prod_{i=1}^{k} M^i(t) \quad (1)$$

$$M^i(t) = R_{axis}^{i-1,i}(t)R^i(t) + T^i(t) \quad (2)$$

In the above, joint 0 (where i=0) indicates a root, and $R_{axis}^{i-1,i}(t)$ denotes a coordinate rotation matrix between joint i and its parent joint (i.e. joint i−1), which is included in neutral pose data. Local coordinates are defined with respect to each joint, wherein the coordinate rotation matrix indicates the correspondence of local coordinates between child and parent joints. $R^i(t)$ denotes a rotation matrix of joint i in local coordinates, which is angle information included in frame data. $T^i(t)$ denotes a transition matrix between joint i and its parent joint, which is included in neutral pose data. The transition matrix indicates the length of a bone interposed between joint i and its parent joint.

Next, a relative position of joint k relative to the root, i.e. $p'^k(t)$, is calculated in accordance with Equation (3).

$$p'^k(t) = p^k(t) - p^{root}(t) \quad (3)$$

In the above, $p^{root}(t)$ denotes the position of a root (i.e. the position of joint 0), i.e. $p^0(t)$, at time t.

Thus, a frame x(t) at time is expressed as "x(t)=$p'^1(t)$, $p'^2(t)$, . . . , $p'^K(t)$", where K denotes the number of joints precluding the root.

4. Data Divide

Figure 5:
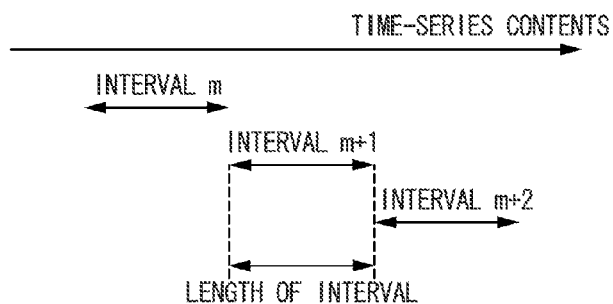
FIG. 5 illustrates a concept of a data divide process executed by the beat extraction unit.

The data divide part 312 divides relative position data of joints into data elements in predetermined intervals. The data divide part 312 performs a data divide process on relative position data of each joint, i.e. $p'^k(t)$. FIG. 5 illustrates a concept of a data divide process, in which relative position data of joints are divided into data elements in prescribed intervals or divisions (each corresponding to the prescribed number of frames). The time length of each division can be arbitrarily determined. For instance, the time length of each division may be sixty-times longer than the time of one frame.

5. Short-Time Principal Component Analysis

The short-time principal component analysis part 313 performs a principal component analysis process on each of relative position data of joints, which are divided by the data divide part 312, in each interval. Using a frame x(t) at time t, each division data X may be expressed as "X={x(t1), x(t2), . . . , x(tN)}", wherein N denotes the time length of each division (corresponding to the number of frames included in each interval or division, and X denotes a matrix of M by N (where M=3×K).

Owing to the principal component analysis process, X is converted into a principal component space.

The principal component analysis method will be described in detail. First, a matrix D of M by N is calculated based on X, precluding its average value, in accordance with Equation (4).

$$D = (X - \overline{X})^T \qquad (4)$$

$$\overline{X} = \{\overline{x}, \overline{x}, \ldots, \overline{x}\}$$

$$\overline{x} = \frac{1}{N}\sum_{i=t1}^{tN} x(i)$$

Next, singular value decomposition is performed on the matrix D of M by N in accordance with Equation (5).

$$D = U \cdot \Sigma \cdot V^T \qquad (5)$$

In the above, U denotes a unitary matrix of M by N; $\Sigma$ denotes a diagonal matrix of N by N with non-negative diagonal elements in a descending order, thus indicating dispersion of coordinates in the principal component space; and V denotes a unitary matrix of M by M indicating coefficients applied to principal components.

Next, the matrix D of M by N is converted into the principal component space in accordance with Equation (6), wherein a matrix Y of M by N denotes coordinates of the principal component space.

$$Y = (U \cdot \Sigma)^T \text{ or } (D \cdot V)^T \qquad (6)$$

The short-time principal component analysis part 313 stores a principal component coordinate matrix Y (indicating coordinates of the principal component space) and a principal component coordinate matrix V (indicating coefficients applied to principal components) in memory per each division.

In this connection, the matrix X (indicating coordinates of the original space) and the principal component coordinate matrix Y can be mutually transformed with each other in accordance with Equations (6) and (7).

$$X = \overline{X} + V \cdot Y \qquad (7)$$

Alternatively, the matrix X can be transformed using high-order r principal components in accordance with Equation (8).

$$\tilde{X} = \overline{X} + V^r \cdot Y^r \qquad (8)$$

In the above, $V^r$ denotes a matrix of M by r including high-order r rows within the principal component coefficient matrix V; $V^r$ denotes a matrix of r by N including high-order r columns within the principal component coordinate matrix Y; and X~ denotes a restored matrix of M by N.

In this connection, a part of a degree of freedom in the original space may be selectively subjected to the principal component analysis process. When beats are expressed using motions of feet alone, for example, the principle component analysis process is performed on a matrix X' of M' by N, which is produced based on relative position data of foot-related joints alone, in accordance with Equations (4), (5), and (6).

6. Principal Component Coordinate Connection

The principal component coordinate connection part 314 connects a time series of coordinates of principal components in each interval. The principal component coordinate connection part 314 performs a principal component coordinate connection process for adjusting coordinates of principal components such that coordinates of principal components are smoothly connected in the boundary between two consecutive intervals.

Figure 6:
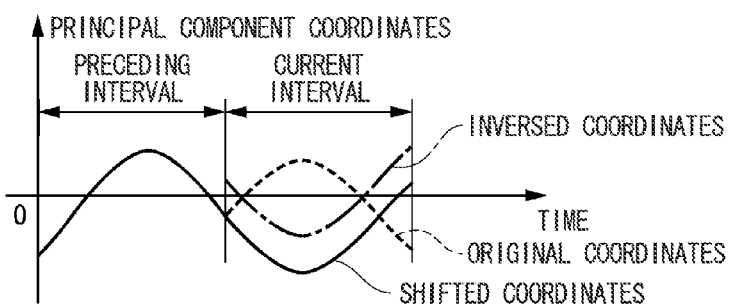
FIG. 6 illustrates a concept of a principal component coordinate connection process executed by the beat extraction unit.

FIG. 6 illustrates a concept of a principal component coordinate connection process. The present invention performs the principal component coordinate process in a time-series manner starting from a first interval. FIG. 6 shows that the principal component coordinate connection process has been completed with respect to previous intervals up to a preceding interval. Subsequently, the principal component coordinate connection process is performed to connect the preceding interval to the current interval. The principal component coordinate connection process adjusts principal component coordinates in the current interval such that principal component coordinates of the current interval are smoothly connected to principal component coordinates of the preceding interval. Specifically, principal component coordinates are adjusted in such a way that principal component coordinates (i.e. original coordinates) of the current interval, which are selected by a principal component selecting step, are subjected to sign negation or coordinate shifting.

The details of the principal component coordinate process are as follows.

(1) Principal Component Coordinate Connection Step S11

In principal component coordinates (i.e. original coordinates of a first principal component) $Y_1$ of the current interval, a coefficient $V_1$ of the first principal component is extracted from a principal component coefficient matrix V of the current interval. Additionally, a coefficient $V_1^{pre}$ of the first principal component is extracted from a principal component coefficient matrix V of the preceding interval stored in memory.

(2) Principal Component Coordinate Connection step S12

Based on the relationship between the coefficient V1 of the first principal component of the current interval and the coefficient V1pre of the first principal component of the preceding interval, a decision is made as to whether or not original coordinates of the first principal component of the current interval will be subjected to sign negation. This sign-negation decision is made in accordance with Equation (9).

When the decision result of Equation (9) indicates sign negation, original coordinates $Y_1$ of the first principal component of the current interval are subjected to sign negation while the principal component coefficient matrix V of the current interval is subjected to sign negation. In contrast, when the decision result of Equation (9) does not indicate sign negation, original coordinates $Y_1$ of the first principal component and the principal component coefficient V are maintained in the current interval, so that they are output as the result of the principal component coordinate connection step S12.

$$\begin{aligned} &\text{if across}(V_1 \cdot V_1^{pre}) > \pi/2 \\ &\quad Y_1' = -Y_1 \\ &\quad V' = V \ldots \\ &\text{else} \\ &\quad Y_1' = Y_1 \\ &\quad V' = V \end{aligned} \quad (9)$$

In the above, $Y_1$ denotes original coordinates of the first principal component which is selected in the current interval; V denotes the principal component coefficient matrix of the current interval; $V_1$ denotes the coefficient of the first principal component in the current interval; and $V_1^{pre}$ denotes the coefficient of the first principal component in the preceding interval. Additionally, $(V_1 \cdot V_1^{pre})$ denotes the inner product of $V_1$ and $V_1^{pre}$; $Y_1'$ denotes the result of the principal component coordinate connection step S12 on the original coordinates $Y_1$ of the first principal component selected in the current interval; and V' denotes the result of the principal component coordinate connection step S12 on the principal component coefficient matrix V of the current interval.

(3) Principal Component Coordinate Connection Step S13

Coordinate shifting is performed on the principal component coordinates $Y_1$ which result from the principal component coordinate connection step S12. Coordinate shifting is performed in accordance with Equation (10). Herein, coordinates $Y_1^{pre}(tN)$ of the first principal component in frame tN of the preceding interval are extracted from the principal component coordinate matrix Y of the preceding interval.

$$Y_1'' = Y_1' + Y_1^{pre}(tN) - Y_1'(t1)$$

$$Y_1^{opt}(t1) = [Y_1^{pre}(tN) + Y_1''(t2)]/2 \quad (10)$$

In the above, $Y_1'(t1)$ denotes coordinates of frame t1 in the principal component coordinates $Y_1'$, which is the result of step S12; $Y_1''(t2)$ denotes coordinates of frame t2 within coordinates $Y_1''$ which is the result of a first mathematical expression of Equation (10).

In the coordinates $Y_1''$ which are the result of the first mathematical expression of Equation (10), coordinates $Y_1''$ of frame t1 are replaced with $Y_1^{opt}(t1)$. The coordinates $Y_1''$ after replacement are the result of coordinate shifting.

(4) Principal Component Coordinate Connection Step S14

The coordinates $Y_1^{opt}(t1)$ which are the result of the principal component coordinate connection step S13 are adapted into the coordinates $Y_1'$ which are the result of the principal component coordinate connection step S12 in the current interval. Thus, it is possible to smoothly connect the principal component coordinates of the current interval to the principal component coordinates of the preceding interval.

The principal component coordinate connection part 314 performs the foregoing principal component coordinate connection process from the first interval to the last interval. Thus, it is possible to produce principal component coordinates "y(t), t=0, 1, 2, ..., T−1" with respect to all intervals connected together, wherein T denotes the number of frames included in motion data.

7. Beat Estimate

The beat estimate part 315 calculates extremal values b(j) based on principal component coordinates y(t) of all connected intervals which are produced by the principal component coordinate connection part 314. The calculated extremal values b(j) are equivalent to beats. A set B of beats is expressed by Equation (11).

$$B = \{b(j), j=1,2,\ldots,J\} = \{t: [y(t)-y(t-1)][y(t)-y(t+1)] > 0\} \quad (11)$$

In the above, J denotes the number of beats.

A set of beats can be calculated by way of other methods than the above method. For instance, the beat estimate part 315 may calculate autocorrelation values based on principal component coordinates of all connected intervals, whereby extremal values b(j) of autocorrelation values are produced as equivalents of beats.

Alternatively, the beat estimate part 315 may calculate autocorrelation values of internal products (according to Equation (9)) based on principal component coefficients of adjacent intervals connected together, whereby extremal values b(j) of autocorrelation values are produced as equivalents of beats.

8. Postprocessing

The postprocessing part 316 detects beat timings from a set B of beats calculated by the beat estimate part 315.

The details of a beat time detection process will be described below.

First, intervals between extremal values included in the set B of beats are approximated using a sinusoidal curve in accordance with Equation (12).

$$s(t) = \cos\left(2\pi \frac{t - b(j-1)}{b(j) - b(j-1)}\right) b(j-1) \le t \le b(j), \quad (12)$$

$$j = 2, 3, \ldots, J$$

Herein, $s_{j-1}(t)$ denotes a sinusoidal value adopted in the interval between an extremal value b(j−1), whose serial number is (j−1) counted from the first one, and an extremal value b(j), whose serial number is j; t denotes a time counted in units of frames, where t=0, 1, 2, ..., T−1; and T denotes the number of frames included in motion data.

Figure 7:
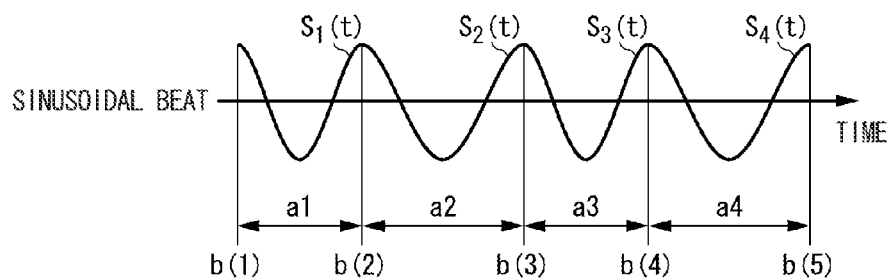
FIG. 7 illustrates a concept of a sinusoidal approximation process executed by the beat extraction unit.

FIG. 7 illustrates a concept of a sinusoidal approximation process according to Equation (12). In FIG. 7, an interval a1 (where j=2), interposed between a first extremal value b(1) and a second extremal value b(2), is approximated using $s_1(t)$. Similarly, an interval a2 (where j=3), interposed between the second extremal value b(2) and a third extremal value b(3), is approximated using $s_2(t)$. An interval a3 (where j=4), interposed between the third extremal value b(3) and a fourth extremal value b(4), is approximated using $s_3(t)$. An interval a4 (where j=5), interposed between the fourth extremal value b(4) and a fifth extremal value b(5), is approximated using $s_4(t)$.

Next, Fourier transform is performed on sinusoidal approximate values $s_{j-1}(t)$ where j=2, 3, ..., J. This Fourier transform is performed using a Fast Fourier Transform (FFT) operator with a Han window adopting the predetermined number L of FFT points. Based on the result of Fourier transform, a maximum component frequency fmax adopted into a maximum component is detected from a frequency range subjected to Fourier transform. Additionally, beat intervals TB are calculated in accordance with a calculation formula of TB=Fs÷fmax, where Fs denotes the number of frames per one second.

Next, a maximum correlation initial phase is calculated between the sinusoidal approximate value $s_{j-1}(t)$ (where j=2, 3, ..., J) and a reference value s'(t) (which is defined according to Equation (13)) in accordance with Equation (14).

$$s'(t)=\cos(2\pi t/TB)b(1)\leq t\leq b(J) \quad (13)$$

$$\hat{\phi} = \underset{\phi}{\mathrm{argmax}}\sum_t s(t)s'(t+\phi) \quad (14)$$

$$0 \leq \phi \leq TB$$

Next, a set EB of beat times eb(j) is calculated in accordance with Equation (15), where EJ denotes the number of beat times eb(j).

$$EB=\{e(j), j=+1,2,\ldots,EJ\}=\{\hat{\phi}+j*TB\} \quad (15)$$

In the present embodiment, the beat extraction unit 31 performs the foregoing beat time detection process.

The beat extraction unit 31 calculates a set EB of beat times eb(j) based on motion data by way of the foregoing beat time detection process. Additionally, the beat extraction unit 31 calculates a tempo of motion in accordance with Equation (16), wherein the tempo denotes the number of beats per one minute. Herein, the number of frames per one second is set to "120".

$$Tempo^{Motion} = \frac{120*60}{TB} \quad (16)$$

In the above, TB denotes the beat interval (counted in units of seconds).

The beat extraction unit 31 stores a set EB of beat times eb(j) and a tempo per each motion data in a beat information storage unit 32. At this time, information, representative of the correspondence between the beat time eb(j) and the principal component analysis interval (subjected to the principal component analysis process), is stored in the beat information storage unit 32. This information clearly indicates the principal component analysis interval to which each beat time belongs.

9. Excitement Calculation

The excitement calculation unit 33 calculates an excitement of motion per each motion data in each principal component analysis interval in accordance with Equation (17).

$$I=tr(\Sigma) \quad (17)$$

In the above, Σ denotes a diagonal matrix including non-negative eigenvalues (aligned in a descending order) according to the principal component analysis process per each interval, indicating a dispersion of coordinates in the principal component space; and tr( ) denotes a matrix trace of constituent elements included in a diagonal matrix.

The excitement calculation unit 33 stores an excitement of motion per each principal component analysis interval in the excitement information storage unit 34.

10. Motion Graph Generation

The motion graph generation unit 35 generates a motion graph per each motion data based on a set EB of beat times eb(j), a tempo, and an excitement. Non-Patent Document 4 teaches details of motion graphs. A motion graph is constituted of nodes (or vertices), edges (or branches) indicative of concatenations between nodes, and weights of edges, wherein there are two types of edges, namely bidirectional edges and unidirectional edges.

Figure 8:
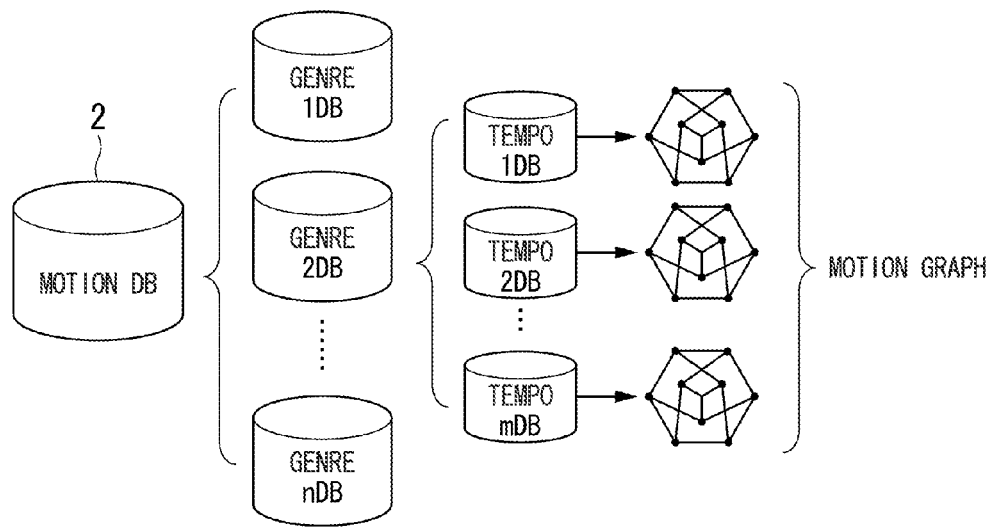
FIG. 8 illustrates a concept of creation of motion graphs.

FIG. 8 illustrates a concept of creation of motion graphs employed in the present embodiment.

Motion data stored in the motion database 2 are classified according to genres, which are determined in advance. Classification using genres is performed based on characteristics of motions. Each motion data is added with genre information representing a genre thereof. The motion graph generation unit 35 discriminates types of motion data based on genre information attached to motion data. In FIG. 8, motion data of the motion database 2 are classified into n genre databases, namely genre 1 DB to genre nDB.

The motion graph generation unit 35 further divides motion data, belonging to the same genre, by use of a value i which is calculated in Equation (18). In FIG. 8, motion data belonging to genre 2 are divided into m tempo databases, namely tempo 1 DB to tempo mDB.

$$i = \frac{Tempo^{Motion} - Tempo_{min}^{Motion}}{Q_{Tempo}} \quad (18)$$

In the above, $Q_{Tempo}$ denotes a time length of a tempo; $Tempo^{Motion}$ denotes a tempo with regard to motion data subjected to classification; and $Tempo^{Motion}_{min}$ denotes a minimum tempo within genres subjected to classification.

The motion graph generation unit 35 generates a motion graph per each tempo database which is divided from motion data belonging to the same genre by use of the value i calculated by Equation (18).

Figure 9:
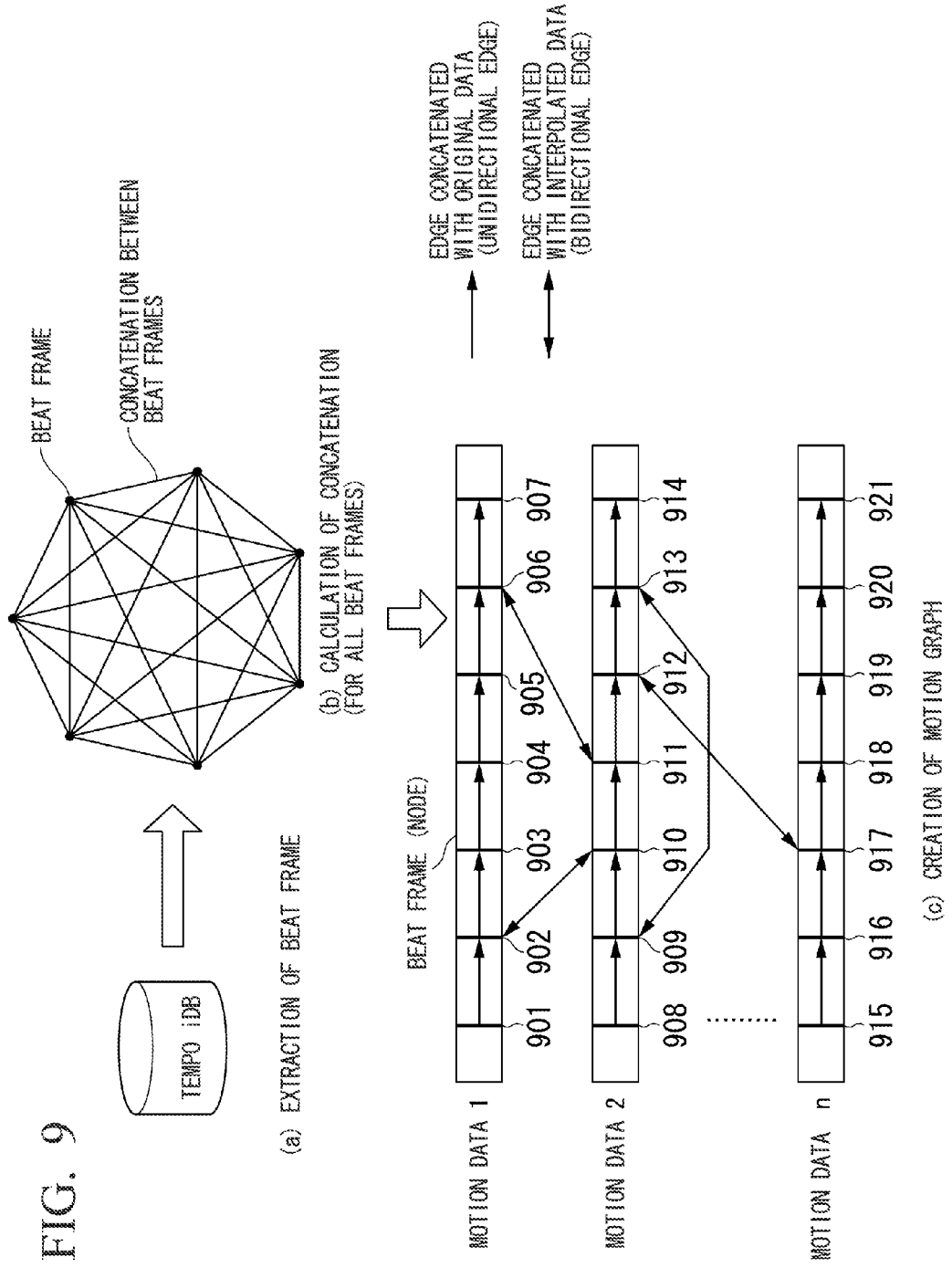
FIG. 9 illustrates a concept of generation of motion graphs.

FIG. 9 illustrates a concept of generation of motion graphs employed in the present embodiment. A procedure of generating a motion graph for a tempo database of a specific genre (i.e. a tempo iDB) will be described with reference to FIG. 9.

(1) Beat Frame Extraction Step

In a beat frame extraction step, beat frames (i.e. frames involving beat times) are all extracted from motion data belonging to the tempo iDB, thus generating a set $F^{iALL}_B$ of extracted beat frames.

(2) Concatenation Calculation Step

In a concatenation calculation step, distances are calculated using pairs of beat frames, selected from among all beat frames included in the set $F^{iALL}_B$ in accordance with Equation (19) or Equation (20), wherein $d(F^i_B, F^j_B)$ denotes a distance between a beat frame $F^i_B$ and a beat frame $F^j_B$.

$$d(F^i_B, F^j_B) = \sum_k w_k \left\| \log(q_{j,k}^{-1} q_{i,k}) \right\|^2 \quad (19)$$

In the above, $q_{i,k}$ denotes a quaternion of a kth joint of a beat frame $F^i_B$; $w_k$ denotes a weight of the kth joint, which is determined in advance. FIG. 10 shows exemplary values of the weight $w_k$, which are determined per each joint in advance. FIG. 10 shows "Right and Left Hip" with a weight of 1.0000; "Right and Left Knee" with a weight of 0.0901; "Right and Left Shoulder" with a weight of 0.7884; and "Right and Left Elbow" with a weight of 0.0247.

$$d(F^i_B, F^j_B) = \sum_k \| p_{i,k} - p_{j,k} \| = \quad (20)$$

$$\sum_k \sqrt{(p^x_{i,k} - p^x_{j,k})^2 + (p^y_{i,k} - p^y_{j,k})^2 + (p^z_{i,k} - p^z_{j,k})^2}$$

In the above, $p_{i,k}$ denotes a relative position vector of a kth joint of a beat frame $F^i_B$ relative to the root. That is, $p_{i,k}$ is a vector indicating the position of the kth joint of the beat frame $F^i{}_B$ which is calculated without considering the position and direction of the root.

In this connection, a distance between beat frames can be calculated as a weighted average between differences of physical values, such as position, velocity, angle, and angular velocity per each of joints constituting a specific pose in a subject beat frame.

Next, the concatenation calculation step proceeds to calculation of concatenation in accordance with Equation (21), which produces a concatenation $c(F^i{}_B, F^j{}_B)$ between a beat frame $F^i{}_B$ and a beat frame $F^j{}_B$.

$$rd = \frac{d(F^i_B, F^j_B)}{d(F^i_B) + d(F^j_B)} \qquad (21)$$

$$c(F^i_B, F^j_B) = \begin{cases} 1 & rd < TH \\ 0 & rd \geq TH \end{cases}$$

In the above, $d(F^i{}_B)$ denotes a distance between a preceding frame and a subsequent frame with respect to a beat frame $F^i{}_B$, which is calculated using the same calculation as Equation (19) or Equation (20); and TH denotes a threshold which is determined in advance.

The concatenation $c(F^i{}_B, F^j{}_B)=1$ indicates a similarity between a pose of a beat frame $F^i{}_B$ and a pose of a beat frame $F^j{}_B$. The concatenation $c(F^i{}_B, F^j{}_B)=0$ indicates a dissimilarity between the pose of the beat frame $F^i{}_B$ and the pose of the beat frame F (3) Motion Graph Creating Step In a motion graph creating step, all beat frames included in the set $F^{iALL}{}_B$ are set to nodes of a motion graph, whereby the initial number of nodes included in a motion graph matches with the number of beat frames included in the set $F^{iALL}{}_B$.

When $c(F^i{}_B, F^j{}_B)=1$, a bidirectional edge is interposed between the node of the beat frame $F^i{}_B$ and the node of the beat frame $F^j{}_B$. When $c(F^i{}_B, F^j{}_B)=0$, a bidirectional edge is not interposed between the node of the beat frame $F^i{}_B$ and the node of the beat frame $F^j{}_B$.

Next, unidirectional edges are interposed between nodes of adjacent beat frames within the same motion data. Each unidirectional edge indicates a direction from a node of a preceding beat frame to a node of a subsequent beat frame with respect to time.

Next, a weight is calculated for a bidirectional edge. For instance, a weight for a bidirectional edge between the node of the beat frame $F^i{}_B$ and the node of the beat frame $F^j{}_B$ is calculated in accordance with Equation (22).

$$w^2(F^i_B, F^j_B) = \begin{cases} rd & \text{if } rd > 2 \\ 2 & \text{others} \end{cases} \qquad (22)$$

In the above, rd is calculated by Equation (21).

Next, weights for unidirectional edges are calculated. For instance, a weight for a unidirectional edge between the node of the beat frame $F^i{}_B$ and the node of the beat frame $F^j{}_B$ is calculated by way of either (a) or (b).

(a) The weight adopts an excitement of the principal component analysis interval when both the beat frames $F^i{}_B$ and $F^j{}_B$ belong to the same principal component analysis interval.
(b) The weight adopts an average of excitements in different principal component analysis intervals when the beat frames $F^i{}_B$ and $F^j{}_B$ belong to different principal component analysis intervals.

Figure 11:
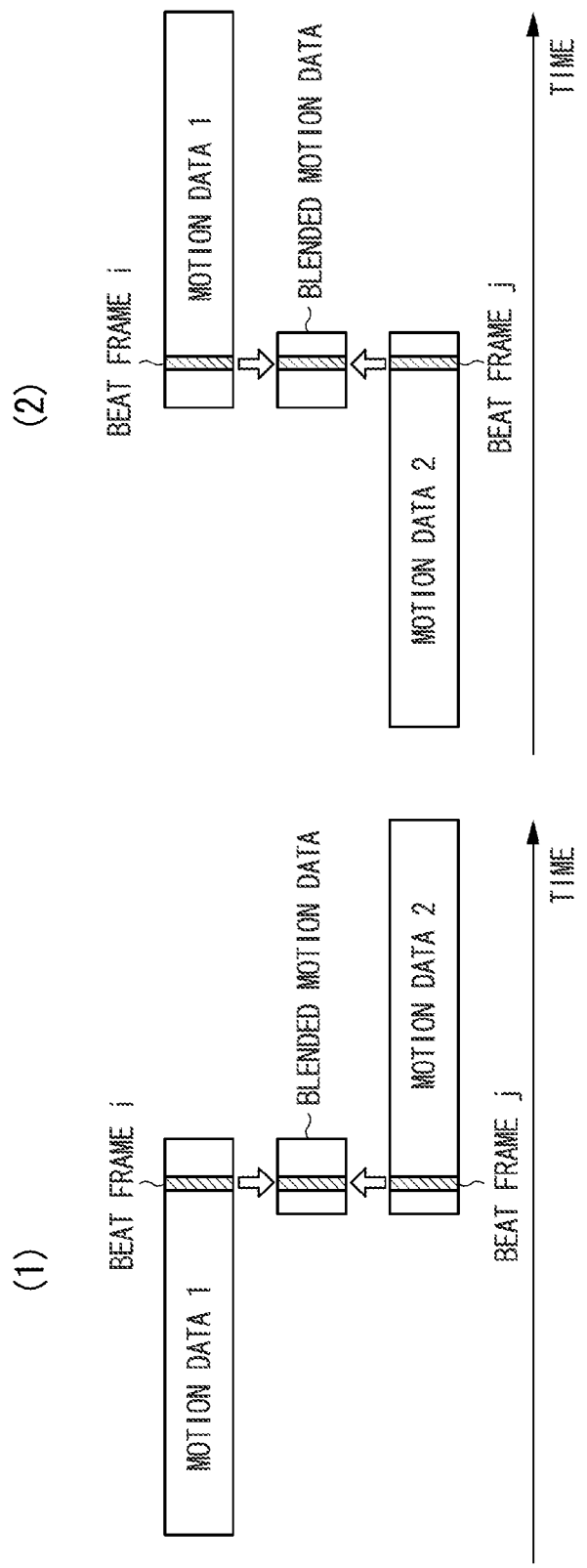
FIG. 11 illustrates a concept of a blending process on a bidirectional edge interposed between two nodes of beat frames.

Next, a blending process is performed on motion data regarding terminal nodes (i.e. beat frames) of each bidirectional edge. The blending process is performed per each bidirectional edge. For this reason, each bidirectional edge involves two blending processes as shown in (1) and (2) in FIG. 11. FIG. 11 illustrates a concept of blending a bidirectional edge between a node of beat frame i and a node of beat frame j. FIG. 11(1) shows a blending process in a direction from the node of beat frame i to the node of beat frame j, whilst FIG. 11(2) shows a blending process in a direction from the node of beat frame j to the node of beat frame i.

Figure 12:
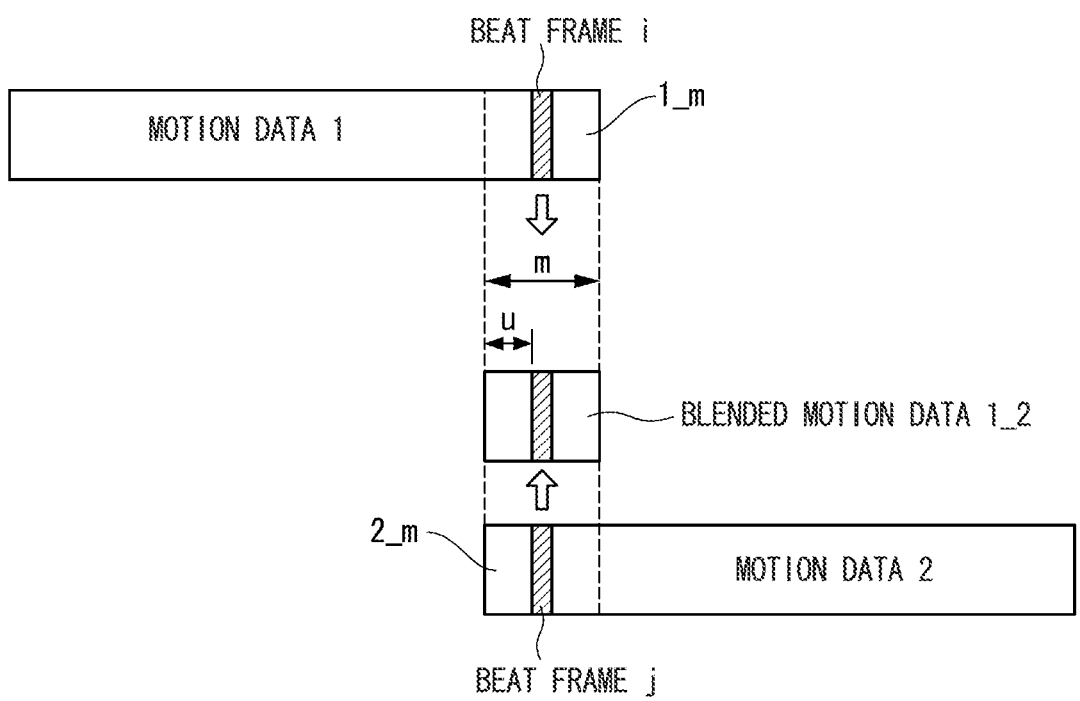
FIG. 12 illustrates a concept of a blending process in a direction from a node of beat frame i to a node of beat frame j.

FIG. 12 illustrates a concept of a blending process, which corresponds to FIG. 11(1). A blending process of FIG. 11(1), which is carried out in the direction from the node of beat frame i to the node of beat frame j, will be described with reference to FIG. 12.

The blending process produces interpolation data (or blended motion data) 1_2, representing a connected part between motion data 1 (ascribed to beat frame i) and motion data 2 (ascribed to beat frame j), in such a way that an artificially connected motion does not occur in transition between motion data 1 and motion data 2. The present embodiment utilizes a frame of a certain time length so as to interpolate the connected part between two motion data by way of quaternion spherical linear interpolation. Specifically, blended motion data 1_2 applied to a connected part (with a time length m, where m is a predetermined value) between motion data 1 and motion data 2 is produced using data 1_m, which is a last part of motion data 1 with a time length m, and data 2_m which is a top part of motion data 2 with a time length m. With a ratio u/m which is a ratio of a top distance u to the time length m of the corrected part, a part of frame i of the data 1_m corresponding to the distance u is mixed with a part of frame j of the data 2_m corresponding to the distance u. Specifically, a plurality of frames constituting blended motion data 1_2 is produced in accordance with Equation (23) and Equation (24), wherein Equation (23) refers to one bone of a human skeleton.

$$q^b(k,u) = \text{slerp}(q^i(k,u), q^j(k,u), u/m) \qquad (23)$$

$$\text{slerp}(q1, q2, x) = q1(q1^{-1}q2)^x \qquad (24)$$

In the above, m denotes the total number (i.e. the predetermined number) of frames (or blending frames) constituting blended motion data 1_2; u denotes the place of order counted from first blending frame (where $1 \leq u \leq m$); q denotes a quaternion of a bone in the u-th blending frame; $q^i(k,u)$ denotes a quaternion of the k-th bone of the u-th blending frame; $q^j(k,u)$ denotes a quaternion of the k-th bone of the u-th blending frame; and $q^b(k,u)$ denotes a quaternion of the k-th bone of the u-th blending frame. Blending is not carried out on the root. Equation (24) is a calculation formula of "slerp" (i.e. "spherical linear interpolation").

Blended motion data 1_2 is a connected part between motion data 1 and motion data 2.

Next, weights of nodes are calculated, wherein weights of nodes serve as metadata representing a capacity of synchronization with a musical tune. The weight of each node indicates the number of nodes which can be connected to each node. Using weights, nodes are classified into three types, namely TYPE1, TYPE2, and TYPE3.

Nodes belonging to TYPE1 are each able to subsequently connect multiple nodes thereto. For instance, nodes included in loops or nodes which are connectible to nodes included in loops are each able to subsequently connect nodes included in loops; hence, they are each able to subsequently connect multiple nodes thereto.

Nodes belonging to TYPE2 are terminal nodes or annexed nodes. Terminal nodes are unable to subsequently connect nodes thereto. For instance, terminal nodes do not involve bidirectional edges and unidirectional edges. The weight of each terminal node is set to zero. Annexed nodes are nodes with unidirectional edges connected to terminal nodes or annexed nodes. The weight of each annexed node is equal to the weight of its child node (i.e. a node subsequently connected to each annexed node) added with one.

Nodes belonging to TYPE3 are not classified into either TYPE1 or TYPE2. Nodes belonging to TYPE3 are not used in a synchronization process (which will be described later).

FIG. 9 shows twenty-one nodes 901 to 921, among which nodes 901-906, 908-913, and 915-917 are classified into TYPE1. These nodes have infinite weights. Among nodes 901 to 921, nodes 907, 914, 918-921 are classified into TYPE2. Nodes 907 and 914 are terminal nodes with zero weight. Nodes 918 to 920 are annexed nodes, wherein the weight of the node 920 is set to "1"; the weight of the node 919 is set to "2"; and the weight of the node 918 is set to "3".

Next, a calculation process of calculating weights of nodes will be described below.

(1) Node Weight Calculation Step S21

Among nodes included in a motion graph, nodes included in a loop and nodes which are each able to subsequently connect nodes included in a loop thereto are specified as nodes belonging to TYPE1. Then, a node weight calculation step S22 is carried out.

Figure 13:
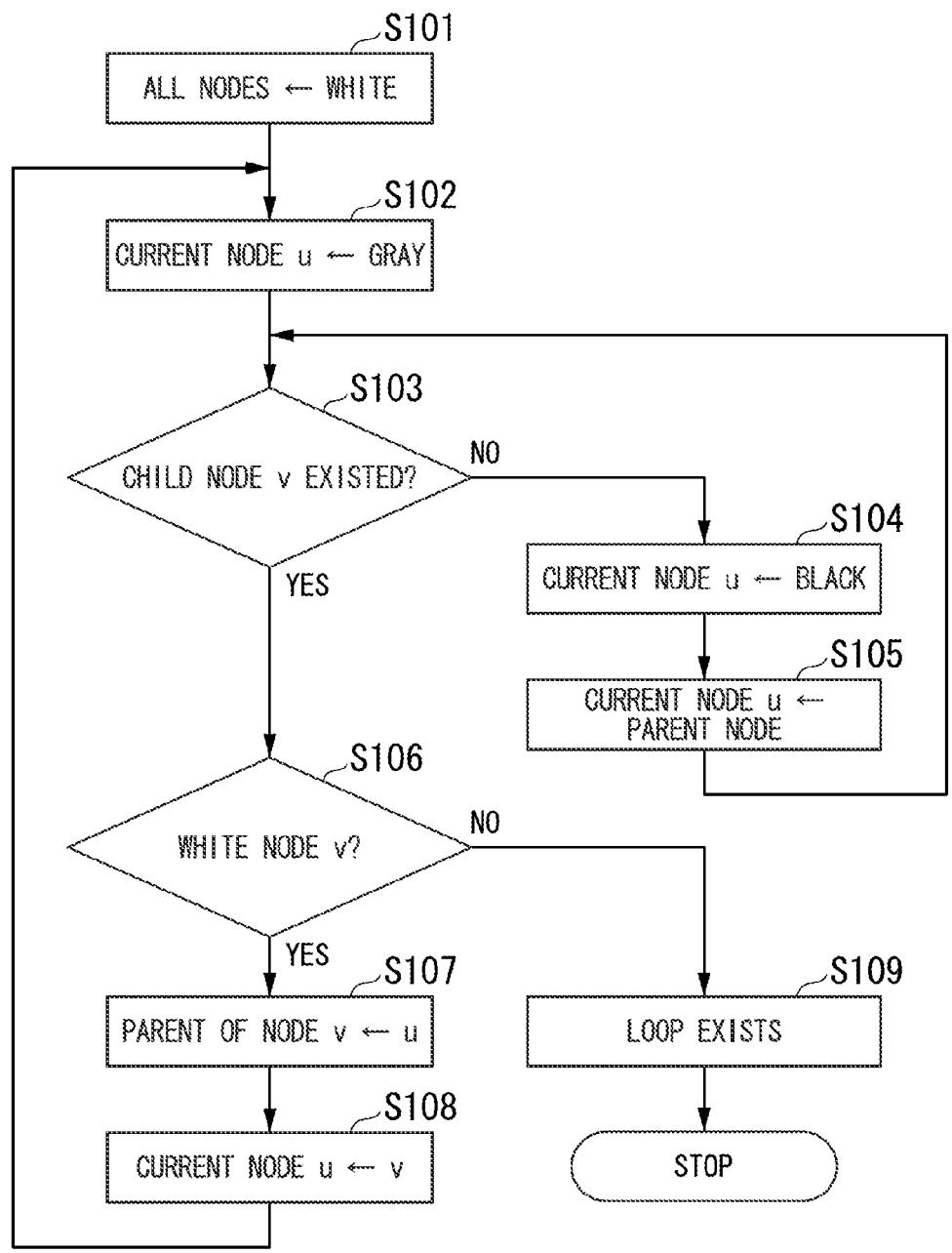
FIG. 13 is a flowchart of a loop specifying process for specifying nodes of TYPE1 within nodes shown in FIG. 9.

In the node weight calculation step S21, for example, a process shown in FIG. 13 is performed to specify loops.
(a) Step S101: All nodes are colored "white". Then, the flow proceeds to step S102.
(b) Step S102: A current node u is colored "gray". Then, the flow proceeds to step S103.
(c) Step S103: When the current node u is followed by a child node v, the flow proceeds to step S106. Otherwise, the flow proceeds to step S104.
(d) Step S104: The current node u is colored "black". Then, the flow proceeds to step S105.
(e) Step S105: The current node u is regarded as a parent node. Then, the flow proceeds to step S103.
(f) Step S106: When the node v is colored "white", the flow proceeds to step S107.
Otherwise, the flow proceeds to step S109.
(g) Step S107: The node u is regarded as a parent node of the node v. Then, the flow proceeds to step S108.
(h) Step S108: The current node u is newly regarded as a node v. Then, the flow proceeds to step S102.
(i) Step S109: It is determined that a loop is found. Then, this process is exited.

(2) Node Weight Calculation Step S22

Among nodes of a motion graph precluding nodes belonging to TYPE1, terminal nodes and annexed nodes are specified as nodes classified into TYPE2. Then, a node weight calculation step S23 is carried out.

(3) Node Weight Calculation Step S23

Among nodes of a motion graph precluding nodes belonging to TYPE1 and TYPE2, nodes classified into TYPE3 are specified. Then, the node weight calculation process is exited.

Using the foregoing motion graph creating steps, it is possible to produce motion graph data in correspondence with a certain tempo database (or tempo iDB) and a certain genre. Motion graph data encompass various pieces of information, i.e. nodes (or beat frames), edges (e.g. bidirectional edges or unidirectional edges) interposed between nodes, blended motion data in two directions indicated by bidirectional edges, and weights of nodes.

The motion graph generation unit 35 stores motion graph data, which are produced per each genre and per each tempo database and per each genre, in the database 12. Thus, the database 12 is able to store motion graph data per each genre and per each tempo database.

The foregoing functionality of the metadata creation device 10 is implemented in an offline manner, thus creating the database 12. Using the database 12, the video content generation device 20 is able to carry out an online process, which will be described below.

Figure 14:
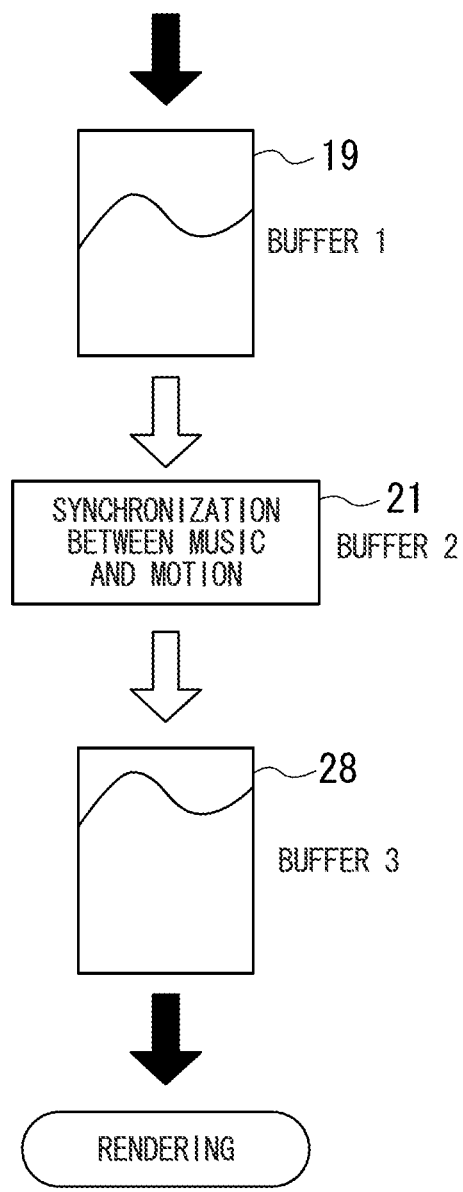
FIG. 14 illustrates a concept of processing video data synchronized with music data downloaded by way of streaming distribution.

The video content generation device 20 generates video data synchronized with music data representing musical tunes which are used for generating video contents and which are downloaded by way of streaming distribution, thus reproducing video data and music data. FIG. 14 illustrates a concept of processing video data synchronized with music data downloaded by way of streaming distribution. The video data generation device 20 accumulates music data (which are downloaded by way of steaming distribution) in the streaming data storage unit 19, which serves as "buffer 1" in FIG. 14. Until a predetermined amount of music data, corresponding to sound reproduced in a predetermined time (e.g. ten seconds), is accumulated in the music data storage unit 21 which serves as "buffer 2" in FIG. 14, the video content generation device 20 transfers music data per each beat, from a top part to an ending part of a musical tune, to the music data among music data which have been accumulated in the streaming data storage unit 19.

When the predetermined amount of music data, corresponding to the predetermined time of reproduction, is completely accumulated in the music data storage unit 21, the video content generation device 20 starts to generate video data synchronized with accumulated music data. Specifically, the video content generation device 20 transfers music data of a first beat, among the predetermined amount of music data corresponding to the predetermined time of reproduction, to the video content storage unit 28 which serves as "buffer 3" in FIG. 14. Among already generated video data, the video content generation device 20 selectively stores video data, which is synchronized with the first beat of music data (which has been transferred to buffer 3), in the video content storage unit 28 in connection with the selected video data (which has been transferred to buffer 2), thus achieving a synchronization process. Thus, one beat of music data is transferred from the music data storage unit 21 to the video content storage unit 28. At this timing, the amount of music data accumulated in the music data storage unit 21 is smaller than the predetermined amount of music data (corresponding to the predetermined time of reproduction) by one beat.

Since the amount of music data accumulated in the music data storage unit 21 is smaller than the predetermined amount of music data by one beat, one beat of music data, located in the top portion of music data accumulated in the streaming data storage unit 19, is transferred to the music data storage unit 21. Thus, the music data storage unit 21 restores the predetermined amount of music data corresponding to the predetermined time of reproduction. Since the music data storage unit 21 has accumulated the predetermined amount of music data corresponding to the predetermined time of reproduction, the vide content generation device 20 sequentially generates video data synchronized with accumulated music data in the music data storage unit 21, so that the video content storage unit 28 stores a first beat of music data (among the predetermined amount of music data) and video data synchronized with one beat of music data. By repeating this procedure, the video content generation device 20 is able to generate video data per each beat in synchronization with music data corresponding to the predetermined time of reproduction, wherein a first beat of music data (selected from among the predetermined amount of music data corresponding to the predetermined time of reproduction) and video data synchronized with the first beat of music data are mutually correlated to each other and stored in the video content storage unit 28.

By repeating the foregoing synchronization process, the video content generation device 20 reproduces music data and video data, which are mutually correlated to each other, stored in the video content storage unit 28.

While reproducing music data and video data, the video content generation device 20 performs the synchronization process per each beat of music data based on the predetermined amount of music data until distribution of music data is stopped. That is, the video content generation device 20 is able to reproduce music data and video data (synchronized with music data) without waiting for the timing at which all music data corresponding to one musical tune are completely distributed. Since the synchronization process is performed per each beat, it is possible to generate video data optimally suited to music data.

Next, constituent elements of the video content generation device 20 included in the video content generation system 1 will be described in detail.

(1) Streaming Data Storage

Music data representing musical tunes used for generating video contents are downloaded to the video content generation device 20 by way of streaming distribution from the music file 3, wherein streaming music data are accumulated in the streaming data storage unit 19.

(2) Music Data Storage

The music data storage unit 21 accumulates the predetermined amount of music data corresponding to the predetermined time of reproduction (e.g. ten seconds). When the music data storage unit 21 has not completely accumulated the predetermined amount of music data, music data accumulated in the streaming data storage unit 19 are transferred to the music data storage unit 21 in units of beats.

(3) Music Analysis

When the music data storage unit 21 has completely accumulated the predetermined amount of music data corresponding to the prescribed time of reproduction, the music analysis unit 22 reads and analyzes music data from the music data storage unit 21, thus extracting musical characteristics from music data. The present embodiment adopts the foregoing technology of Non-Patent Document 2 so as to extract beat intervals and beat times from the prescribed amount of music data accumulated in the music data storage unit 21. Additionally, the present embodiment calculates excitements which occur in the predetermined amount of music data in accordance with Equation (25).

$$IntM(k) = \frac{1}{N(k) * J} \sum_{j} \sum_{i \in Music(k)} (s(i,j))^2 \quad (25)$$

$$I(k) = \frac{1}{2W+1} \sum_{i=k-W}^{k+W} IntM(i)$$

In the above, s(I,j) denotes an ith signal of a jth channel of a musical tune; N(k) denotes the number of signals included in a kth segment of a musical tune; W denotes a fixed length (e.g. 2); and I(k) denotes an excitement of a kth segment.

Additionally, the music analysis unit 22 calculates a temp of music in accordance with Equation (26), wherein the tempo of music is the number of beats per one minute.

$$Tempo^{Music} = \frac{60}{TB_{music}} \quad (26)$$

In the above, $TB_{music}$ denotes a beat interval (measured in units of seconds).

The music analysis unit 22 stores musical characteristics, i.e. beat intervals, beat times, tempos, and excitements extracted from the prescribed amount of music data, in the music analysis data storage unit 23. Additionally, the music analysis unit 22 stores the predetermined amount of music data in the video content storage unit 28.

(4) Optimum Path Search

The optimum path search unit 24 selects motion graph data, suited to a musical tune used for generating video contents, from among motion graph data stored in the database 12 of the metadata creation device 10. Additionally, the optimum path search unit 24 selects motion graph data, suited to the tempo of a musical tune used for generating video contents, from among motion graph data corresponding to the genre of a musical tune used for generating video contents. The genre of a musical tune is input by a user or determined in advance.

Specifically, the optimum path search unit 24 detects a minimum tempo from motion graph data corresponding to the selected genre and the tempo of music analyzed by the music analysis unit 22. Calculation of Equation (18) is performed using the minimum tempo. Then, the optimum path search unit 24 selects motion graph data, which matches with the calculated value i of Equation (18), from among motion graph data which is input by the user or determined in advance.

The optimum path search unit 24 searches an optimum path for concatenating nodes of a motion graph by use of selected motion graph data and musical characteristics which are analyzed by the music analysis unit 22 and stored in the music analysis data storage unit 23. An optimum path search method will be described below.

(a) Start Point Select Step

In a start point select step, candidates of nodes each corresponding to a start point of motion in a video content are selected from among nodes of a motion graph. All nodes corresponding to first beat frames of motion data are selected from among nodes of a motion graph as candidates of start-point nodes. That is, a plurality of candidates of start-point nodes is normally selected from among nodes of a motion graph.

(b) Optimum Path Search Step

In an optimum path search step, a plurality of optimum paths each starting from each start-point node is searched with respect to candidates of start-point nodes on a motion graph, wherein a minimum cost path is selected from among these optimum paths. The present embodiment adopts a path search method disclosed in Non-Patent Document 5, in which an optimum path is searched by way of dynamic programming with respect to a specific start point. This path search method is called a dynamic programming update method. The details of the optimum path search step adopting the dynamic programming update method will be described below.

First, costs applied to paths, each of which starts from a candidate of a start-point node u to reach any node i on a motion graph, are initialized in accordance with Equation (27). This operation is referred to as a zero-time shortest path calculating operation.

$$shortestPath(v, 0) = \begin{cases} 0 & v \in InitS \\ \infty & others \end{cases} \quad (27)$$

In the above, InitS denotes a set of start points.

This operation is repeated multiple times such as first-time shortest path calculating operation, ..., k-time shortest path calculating operation. In the k-time shortest path calculating operation, a cost applied to an optimum path, which starts from the candidate of a start-point node u to reach all nodes v on a motion graph, is calculated in accordance with Equation (28).

$$shortestPath(v, k) = \min_{v \in V}(shortestPath(i, k-1) + edgeCost(i, v)) \quad (28)$$
$$k > 0$$

In the above, V denotes a set of nodes on a motion graph; shortestPath(v,k) denotes a cost of an optimum path from the start-point node u to the node v; and edgeCost(i,v) denotes an edge cost from the node i to the node v. The edge cost is calculated in accordance with Equation (30).

The first-time shortest path calculating operation and onward are repeated K times in accordance with Equation (28), wherein K denotes the number of beats included in the predetermined amount of music data used for generating video contents in the predetermined time of reproduction. The number K of beats is equal to the total number of beat times included in the predetermined amount of music data corresponding to the predetermined time of reproduction. The number K can be easily calculated by counting the number of data elements stored in the music analysis data storage unit 212, which has already stored all beat times included in the predetermined amount of music data.

The shortest path calculating operation using Equation (27) and Equation (28) is performed with respect to all candidates of start-point nodes. Based on the result produced by repeating the shortest path calculating operation K times on all candidates of start-point nodes, it is possible to select a minimum-cost path in accordance with Equation (29).

$$shortestPath(K) = \min_{v \in V}(shortestPath(v, K)) \quad (29)$$

In the above, shortestPath(v,K) denotes the cost of an optimum path from the start-point node u to the end-point node v, which is produced by repeating the optimum path calculating operation K times; and shortestPath(K) denotes the cost of a minimum-cost path from the start-point node u to the end-point node v.

In this connection, TH denotes the number of beats counted until the end of music. According to an estimate method of TH, for example, TH is estimated by dividing the remaining time of music (i.e. the time length of music until its ending) by the number of beats per second. When the number of beats until the end of music (i.e. the time length of music) is unknown, it is possible to set an infinite value as TH.

Since the weight w(v) of each node included in the minimum-cost path satisfies the condition of w(v)>=TH in which the weight w(v) must be equal to or above the number of beats until the end of music, it is possible to eliminate interrupts in the continuity of motion data during reproduction of music. When the number TH of beats until the end of music is unknown, for example, the weight of each node included in the minimum-cost path must be normally infinite.

The edge cost is calculated every time in accordance with Equation (30).

$$edgeCost(i, j) = \quad (30)$$
$$\begin{cases} \|\overline{w}(i, j) - \overline{I}(k)\| & \text{if } e(i, j) \in E1 \\ rd * \|\overline{w}(m, j) - \overline{I}(k)\| & \text{if } e(i, m) \in E2 \ \& \ e(m, j) \in E1 \\ \infty & \text{other} \end{cases}$$

In the above, w(i,j) denotes the weight of a normalized edge; I(k) denotes an excitement which occurs between beat k and beat k+1 in normalization of music; rd is calculated by Equation (21); E1 denotes a set of unidirectional edges; and E2 denotes a set of bidirectional edges.

The optimum path search step determines the minimum-cost path, which is selected by Equation (29), as the search result of the optimum path. The optimum path includes K nodes including one start-point node u, (K−2) via-nodes i, and one end-point node v. Since a plurality of candidates of start-point nodes is normally detected from a motion graph, the optimum path search step produces a plurality of optimum paths, the number of which is equal to the number of candidates of start-point nodes. Among these optimum paths, the minimum-cost path and its start-point node are selected as the final result of the optimum path. The final result of the optimum path includes K nodes including one optimum start-point node $u^{opt}$, (K−2) via-nodes $i^{opt}$, and one end-point node $v^{opt}$.

(5) Synchronization

The synchronization unit 25 generates synchronization information, establishing correlation between motion data and music data, in accordance with the optimum path searched by the optimum path search unit 24. The details of a synchronization information generating method will be described below.

First, a time between adjacent beat frames in the counting order of beat frames included in the optimum path is detected with respect to K beat frames, corresponding to K nodes (i.e. one start-point node $u^{opt}$, (K−2) via-nodes $i^{opt}$, and one end-point node $v^{opt}$) included in the optimum path searched by the optimum path search unit 24. Additionally, a frame rate between adjacent beat frames is detected. Furthermore, times between adjacent beats in a time domain are calculated with respect to K beats included in a musical tune used for generating video contents.

Figure 15:
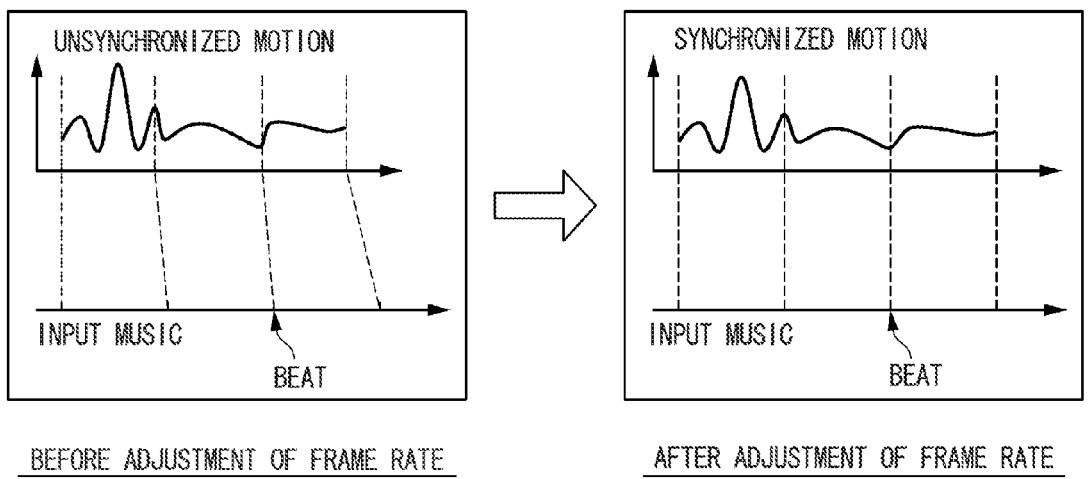
FIG. 15 illustrates a concept of adjusting a motion frame rate between adjacent beat frames.

Next, the motion frame rate is adjusted (or increased/decreased) in accordance with Equation (31) so that beat intervals of a musical tune will match beat intervals of a motion. FIG. 15 illustrates a concept of adjusting the motion frame rate. Equation (31) calculates a frame rate between beat frame n and beat frame (n+1), where n denotes a natural number ranging from "1" to "K−1".

$$rate\_new = \frac{t^{motion}_{node2} - t^{motion}_{node1}}{t^{music}_{node2} - t^{music}_{node1}} \times rate\_old \quad (31)$$

In the above, $t^{motion}_{node2}$ denotes a time of a preceding beat frame while $t^{motion}_{node1}$ denotes a time of a subsequent beat frame within adjacent beat frames. Additionally, $t^{music}_{node2}$ denotes a preceding beat time while $t^{music}_{node1}$ denotes a subsequent beat time within adjacent beats in a musical tune. Furthermore, rate_old denotes an original frame rate while rate_new denotes an adjusted frame rate.

According to the synchronization information generating method, the synchronization unit 25 produces one start-point beat frame (corresponding to a start point of motion in video content), one end-point beat frame (corresponding to an end point of motion in video content), K–2 via-beat frames (which exits in the range from the start-point beat frame to the end-point beat frame), and the adjusted frame rate between adjacent beat frame. The synchronization unit 25 stores synchronization information, including the start-point beat frame, the via-beat frames, the end-point beat frame, the adjusted frame rate, and blended motion data between beat frames, in the synchronization information storage unit 26. Herein, the synchronization information includes blended motion data along only the direction of the optimum path searched by the optimum path search unit 24.

(6) Video Date Generation

Based on the synchronization information stored in the synchronization information storage unit 26, the video data generation unit 27 generates video data which are reproduced with music data representing a musical tune used for generating video contents. Specifically, the video data generation unit 27 retrieves a plurality of motion data, which are necessary for the optimum path to start from the start-point beat frame and reach the end-point beat frame by way of the via-beat frames, from the motion database 2.

Next, a connected part between retrieved motion data (i.e. each end of a bidirectional edge) is replaced with blended motion data. At this time, parallel translation is carried out in each connected part between motion data with respect to root coordinates of motion data and its root direction. When a plurality of motion data is concatenated, root coordinates of each motion data still remain as local coordinates uniquely adapted to each motion data. If root coordinates are not adjusted between adjacent motion data, pictures reproduced from motion data simply concatenated together may not demonstrate smooth motion. In each connected part between motion data concatenated together, root coordinates of subsequent motion data are offset to a position indicated by the last frame of preceding motion data. This involves an interpolation process in each connected part between motion data, thus achieving smooth motion in pictures reproduced from motion data concatenated together. This operation is similarly applied to the root direction of each motion data subjected to concatenation, wherein the root direction of subsequent motion data is offset to a position indicated by the last frame of preceding motion data.

Next, the adjusted frame rate between adjacent beat frames is applied to concatenated motion data. The video data generation unit 27 transfers a first beat of music data, among the predetermined amount of music data (corresponding to the predetermined time of reproduction) accumulated in the music data storage unit 21, to the video content storage unit 28 while storing video data, which is synchronized with one beat of music data among already generated video data, in the video content storage unit 28 in connection with the transferred music data.

(7) Reproduction

The reproduction unit 29 reproduces video data and music data, which are mutually correlated to each other and stored in the video content storage unit 28. At this time, the reproduction unit 29 sets a frame rate between adjacent beat frames in correspondence with the beat frame added to video data, so that video data and music data are reproduced such that their frames are synchronized with each other. In this connection, the reproduction unit 29 may be configured as an independent device separated from the video content generation device 20.

According to the foregoing processes, the video content generation device 20 is able to generate video data suited to music data, thus reproducing video data and music data in a synchronized manner. In the present embodiment, the optimum path search unit 24 does not always search an optimum path by way of the dynamic programming update method every time one beat of music data is newly accumulated in the music data storage unit 21, whereas the optimum path search unit 24 may adopt another method depending on the condition of newly accumulated music data, in which another optimum path is added to connect between the last node of the already determined optimum path and a node of a motion graph corresponding to newly accumulated music data. This method is called a high-speed determination method for determining an optimum path in a motion graph.

Figure 16:
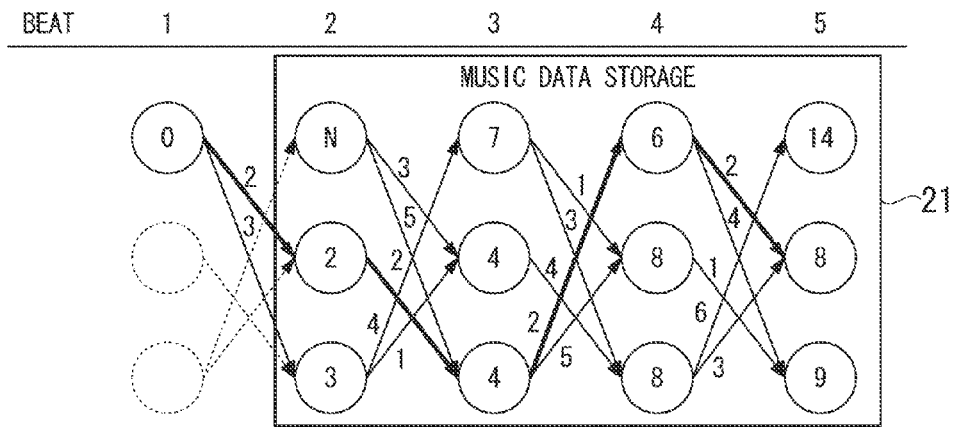
FIG. 16 illustrates a procedure for determining an optimum path of a motion graph by way of the dynamic programming update method.

Next, a concrete example of a method for determining an optimum path of a motion graph will be described. FIG. 16 illustrates a procedure for determining an optimum path of a motion gray by way of the dynamic programming update method, wherein three nodes (namely, an upper node, a middle node, and a lower node) are assigned to each of five beats, i.e. beat 1 to beat 5. With respect to beat 2, the cost of the upper node is "N"; the cost of the middle node is "2"; and the cost of the lower node is "3". Other beats are each connected to three nodes with various costs as shown in FIG. 16. A node with the cost "N" is a node which cannot be connected to nodes stored in the video content storage unit 28. Nodes assigned to beat 1 are accumulated in the video content storage unit 28. The music data storage unit 21 stores music data of beats 2-5 as the predetermined amount of music data corresponding to the predetermined time of reproduction. FIG. 16 shows that an optimum path is calculated to connect the upper node of beat 1, the middle node of beat 2, the lower node of beat 3, the upper node of beat 4, and the middle node of beat 5 (see bold arrows).

After completion of determination of an optimum path, a first beat of music data (i.e. beat 2), among music data accumulated in the music data storage unit 21, is transferred to the video content storage unit 28. Among already generated video data, video data synchronized with the first beat of music data (i.e. the middle node of beat 2) is stored in the video content storage unit 28 in connection with the transferred music data. Since one beat of music data has been transferred from the music data storage unit 21 to the video content storage unit 28, the amount of music data currently accumulated in the music data storage unit 21 is smaller than the predetermined amount of music data, corresponding to the predetermined time of reproduction, by one beat of music data. Considering the current situation in which the amount of music data currently accumulated in the music data storage unit 21 is smaller than the predetermined amount of music data by one beat of music data, the video content generation device 20 transfers a first beat of music data, selected from among music data accumulated in the streaming data storage unit 19, to the music data storage unit 21.

Figure 17:
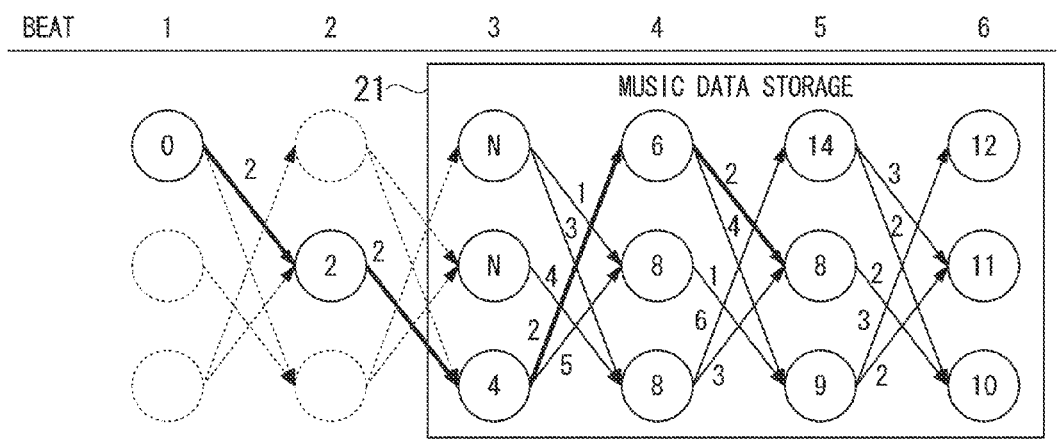
FIG. 17 illustrates a procedure for determining an optimum path of a motion graph by way of the high-speed determination method when one beat of music data is newly accumulated in a music data storage unit of the video content generation device.
Figure 18:
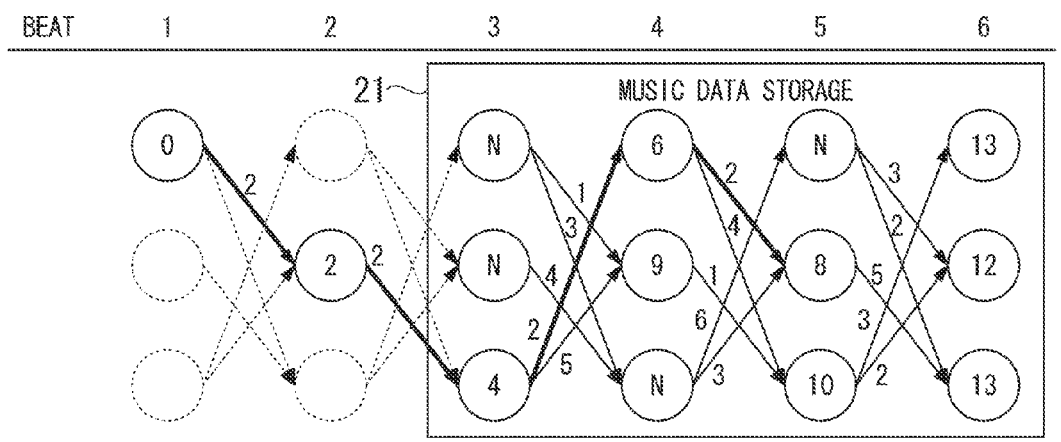
FIG. 18 illustrates a procedure for determining an optimum path of a motion graph by way of the dynamic programming update method when one beat of music data is newly accumulated in the music data storage unit of the video content generation device.

FIGS. 17 and 18 illustrate a procedure for determining an optimum path of a motion graph after one beat of music data (i.e. beat 6) is newly accumulated in the music data storage unit 21. FIGS. 17 and 18 show six beats, namely beat 1 to beat 6, each of which is assigned with three nodes (namely, the upper node, the middle node, and the lower node) with their costs. Various costs are calculated with respect to nodes assigned to beats. Nodes assigned to beats 1-2 are accumulated in the video content storage unit 28, whist four beats of music data (i.e. beats 3-6) are accumulated in the music data storage unit 21 as the predetermined amount of music data corresponding to the predetermined time of reproduction. FIG. 17 differs from FIG. 18 in terms of the costs of the nodes assigned to beat 6 newly accumulated.

When one beat of music data is newly accumulated in the music data storage unit 21, the optimum path search unit 24 makes a decision as to whether or not a first minimum cost (i.e. Cost_temp(opt)) calculated between the last node of the foregoing optimum path (i.e. the middle node of beat 5) and the nodes assigned to the newly added beat (i.e. beat 6) is smaller than a second minimum cost (i.e. Cost_temp(others)), calculated between other candidates of the last node of the optimum path (i.e. the upper node and the lower node of beat 5) and the nodes of the newly added beat, multiplied by a coefficient (i.e. TH(t)). When the first minimum cost is smaller than the second minimum cost multiplied by the coefficient, an optimum path of a motion graph is determined by way of the high-speed determination method. Otherwise, an optimum path of a motion graph is determined by use of the dynamic programming update method. That is, when Cost_temp(opt)<TH(t)×Cost_temp(others), the optimum path search unit 24 determines an optimum path of a motion graph by way of the high-speed determination method. Otherwise, the optimum path search unit 24 determines an optimum path of a motion graph by use of the dynamic programming update method. In this connection, the coefficient TH(t) may be determined in advance or arbitrarily set in response to environments.

FIG. 17 shows that the minimum cost between the last node of the foregoing optimum path (i.e. the middle node of beat 5) and the node of the newly added beat is "10" (see the lower node of beat 6) whilst the minimum cost between the candidates of the last node (i.e. the upper node and the lower node of beat 5) and the node of the newly added beat is "11" (see the middle node of beat 6). When the coefficient TH(t) is set to "1", the situation of FIG. 17 satisfies the condition of "Cost_temp(others)<TH(t)×Cost_temp(others)", so that the optimum path search unit 24 determines an optimum path of a motion graph by way of the high-speed determination method. That is, the optimum path search unit 24 determines an optimum path by adding concatenation between the last node (i.e. the middle node of beat 5) and the node of the newly added beat (i.e. the lower node of beat 6 assigned to a motion graph in correspondence with newly accumulated music data) to the foregoing optimum path which has been already determined with respect to beats 1-5. This optimum path is calculated to connect the upper node of beat 1, the middle node of beat 2, the lower node of beat 3, the upper node of beat 4, the middle node of beat 5, and the lower node of beat 6.

FIG. 18 shows another situation in which the minimum cost between the last node of the foregoing optimum path (i.e. the middle node of beat 5) and the node of the newly added beat is "13" (see lower node of beat 6) whilst the minimum cost between the candidates of the last node (i.e. the upper node and the lower node of beat 5) and the node of the newly added beat is "12" (see the middle node of beat 6). When the coefficient TH(t) is set to "1", the situation of FIG. 18 does not satisfy the condition of "Cost_temp(opt)<TH(t)×Cost_temp (others)", so that the optimum path search unit 24 reads music data from the music data storage unit 21 so as to search a new optimum path.

Figure 19:
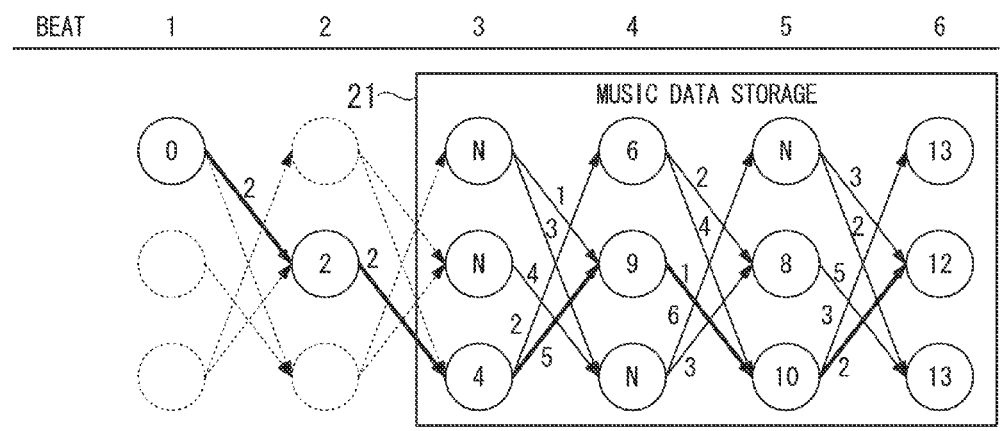
FIG. 19 shows the optimum path which is determined by way of the dynamic programming update method in the situation of FIG. 18.

FIG. 19 shows an optimum path of a motion graph which is determined by way of the dynamic programming update method in the situation of FIG. 18 in which one beat of music data (i.e. beat 6) is accumulated in the music data storage unit 21. In FIG. 19, the optimum path is calculated to connect the upper node of beat 1, the middle node of beat 2, the lower node of beat 3, the middle node of beat 4, the lower node of beat 5, and the middle node of beat 6. When one beat of music data is newly accumulated in the music data storage unit 21, the optimum path search unit 24 may calculate an optimum path differently from the foregoing optimum path. The present embodiment reproduces music data and video data while performing the synchronization process per one beat of music data based on the predetermined amount of music data (corresponding to the predetermined time of reproduction) until distribution of music data is completed; hence, it is possible to generate video data adequately suited to music data.

Figure 20:
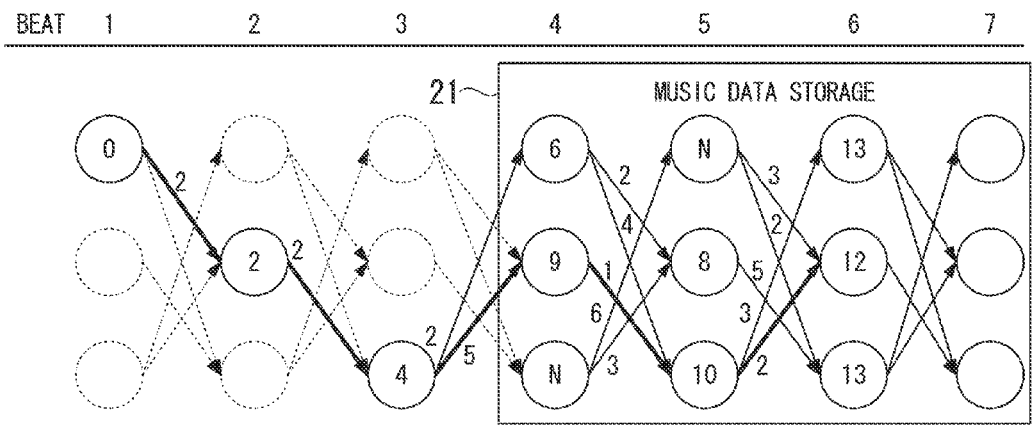
FIG. 20 illustrates a procedure for determining an optimum path of a motion graph in response to a newly added beat after the situation of FIG. 19.

FIG. 20 illustrates a procedure of determining an optimum path of a motion graph after the situation of FIG. 19. In FIG. 20, a first beat of music data (i.e. beat 3), among music data accumulated in the music data storage unit 21, is transferred to the video content storage unit 28, so that among already generated video data, video data synchronized with the first beat of music data (i.e. the lower node of beat 3) is stored in the video content storage unit 28 in connection with the transferred music data. Thus, the video content generation device 20 performs the synchronization process per one beat of music data based on the predetermined amount of music data (corresponding to the predetermined time of reproduction) until distribution of music data is completed.

As described above, the video content generation device 20 reproduces music data and video data while performing the synchronization process per each beat of music data based on the predetermined amount of music data until distribution of music data is completed. Therefore, it is possible to simultaneously reproduce music data and video data synchronized with music data without waiting for completion of distribution of music data of one musical tune. Since the synchronization process is performed per each beat, it is possible to generate video data adequately suited to music data.

When one beat of music data is newly accumulated in the music data storage unit 21, the optimum path search unit 24 makes a decision as to whether or not a first minimum cost between the last node of the foregoing optimum path and the node of the newly added beat is smaller than a second minimum cost, calculated between the candidates of the last node of the foregoing optimum path and the node of the newly added beat, multiplied by a coefficient. When the first minimum cost is smaller than the second minimum cost multiplied by the coefficient, the present embodiment determines an optimum path of a motion graph by use of the high-speed determination method. Otherwise, the present embodiment determines an optimum path of a motion graph by way of the dynamic programming update method. Thus, it is possible to determine a highly optimum path while reducing the amount of processing needed for searching an optimum path; hence, it is possible to achieve high-speed processing for determining an optimum path of a motion graph.

The present embodiment is designed to perform the synchronization process per one beat of music data based on the predetermined amount of music data corresponding to the predetermined time of reproduction; but this is not a restriction. It is possible to perform the synchronization process per multiple beats of music data based on the predetermined amount of music data. For instance, it is possible to perform the synchronization process per every specific amount of music data corresponding to a half of the capacity of the music data storage unit 21 (i.e. a half of the predetermined time of reproduction). When the full capacity of the music data storage unit 21 corresponds to ten beats of music data, for example, it is possible to perform the synchronization process per every five beats of music data based on the predetermined amount of music data (corresponding to the predetermine time of reproduction).

It is possible to change a reproduction manner in such a way that, irrespective of the synchronization process which is normally preformed per one bet of music data based on the predetermined amount of music data, the phase of reproduced music may change based on music data accumulated in the streaming data storage unit 19. Alternatively, it is possible to increase the number of beats in the climax of music while performing the synchronization process based on the predetermined amount of music data. As a music analysis method for detecting a phase change of music or the climax of music, a transposition determination unit (not shown) may detect them by way of the conventionally known detection method. Alternatively, phase changes of music or the timing of the climax of music are stored in headers of music data in advance, so that the transposition determination unit may detect them by reading headers of music data. Herein, the transposition determination unit may change the number of beats, by which the synchronization process is performed, based on variations of detected musical characteristics.

Since the present embodiment establishes synchronization between music data and motion data in each of divisions of music data, there is a possibility that the present embodiment fails to establish ideal synchronization but merely produces a local optimal solution in each division of music data. However, the present embodiment is able to prevent such a local optimal solution by shifting the interval of the synchronization process by a short time (e.g. some beats).

The metadata creation device 10 and the video content generation device 20 may be realized using exclusive hardware or using a general-purpose computer system such as personal computers. Herein, the computer system may execute programs so as to implement functions of constituent elements of the metadata creation device 10 and the video content generation device 20.

The metadata creation device 10 and the video content generation device 20 may be connected to peripheral devices such as input devices and display devices. Herein, input devices may represent keyboards and mouse whilst display devices may represent CRT (Cathode Ray Tube) and liquid crystal display devices. In this connection, the metadata creation device 10 and the video content generation device 20 may be directly connected to peripheral devices or wirelessly connected to peripheral devices via communication lines.

It is possible to store programs, implementing steps of processing executed by the metadata creation device 10 and the video content generation device 20, in computer-readable storage media, so that programs of computer-readable storage media are loaded into and executed by computer system, thus achieving video content generation processing. The term "computer system" may encompass software such as an operating system (OS) and hardware such as peripheral devices.

The term "computer system" may encompass homepage providing environments (or homepage displaying environments) by use of the worldwide web (WWW) system.

The term "computer-readable storage media" may encompass flexible disks, magneto-optic disks, ROM, nonvolatile memory such as rewritable flash memory, portable media such as DVD (Digital Versatile Disk), and other storage devices such as hard-disk units incorporated into a computer system.

The term "computer-readable storage media" may encompass any devices that are able to retain programs in a predetermined time, such as volatile memory (e.g. DRAM, Dynamic Random Access Memory) arranged inside a computer system which may act as servers or clients for transmitting/receiving programs via networks such as the Internet or via communication lines such as telephone lines.

Programs may be transferred from one computer system (whose storage unit stores programs) to another computer system via transmission media or via carrier waves propagating through transmission media. Herein, the term "transmission media" for transmitting programs represent media having functions of transmitting information, such as the Internet or other networks (or communication networks) and telephone lines or communication lines.

Programs may be drafted to implement a part of functions of constituent elements of the present embodiment. Alternatively, programs may be drafted to include differential files which are combined with pre-install programs of a computer system so as to implement functions of constituent elements of the present embodiment.

Heretofore, the present embodiment is described in detail with reference to the accompanying drawings; but the present invention is not necessarily limited to the present embodiment, which can be further modified in various ways using design changes or the like.

For instance, the metadata creation device 10 and the video content generation device 20 may be installed in portable terminals. Alternatively, the metadata creation device 10 and the video content generation device 20 may be installed in video content distribution devices, which are able to distribute music data and video data, stored in the video content storage unit 28, to portable terminals or the like.

The present embodiment is designed to handle human motion data, but the present invention is applicable to motion data of various objects, such as humans, animals, plants, and other living organisms as well as non-living things such as robots.

The present invention is applicable to generation of three-dimensional contents.

The present embodiment can be modified such that motion graphs and metadata are prepared in advance and stored in memory. In this case, the metadata creation device 10 (i.e. the motion graph creation unit and metadata creation unit) are not needed.

The music file 3 may store music data with musical characteristics which are analyzed in advance. In this case, the music analysis unit 22 is not needed.

Lastly, the present invention is not necessarily limited to the embodiment and its variations; hence, the present invention embraces the scope of the invention as defined in the appended claims.

What is claimed is:
1. A video content generation system comprising:
a storage unit which stores a motion graph including nodes, edges, and weights, which are calculated based on motion characteristics extracted from motion data, as well as metadata indicating a synchronization probability for each node between the motion graph and a musical tune used to generate video content;
a music data storage unit which retrieves a predetermined number of beats, each having a plurality of nodes, from the musical tune so as to store a predetermined amount of music data with musical features;
an optimum path search unit that searches an optimum path connecting between nodes, each of which is selected for each beat with a high synchronization probability, on the motion graph with motion characteristics matching musical characteristics based on the predetermined amount of music data by way of a dynamic programming update method;

a synchronization unit which generates synchronization information used to correlate music data to motion data along with the optimum path;

a video data generation unit which generates video data synchronized with music data based on the synchronization information, thus simultaneously reproducing video data and music data, wherein when the music data storage unit newly stores the predetermined number of beats of music data, the optimum path search unit searches a new optimum path in response to a ratio between a first cost, calculated between a last node of a previous optimum path and a newly added node representing one of the plurality of nodes for each beat included in the newly stored music data, and a second cost calculated between a candidate node associated to the last node of the previous optimum path and the newly added node, and wherein the new optimum path is made by adding concatenation between the last node and the newly added node to the previous optimum path.

2. The video content generation system according to claim 1 further comprising:

a motion graph creation unit which creates a motion graph including nodes, edges, and weights based on motion characteristics of motion data;

a metadata creation unit which produces metadata indicating the synchronization probability with the musical tune for each node of the motion graph; and a music analysis unit which retrieves musical features from music data stored in the music data storage unit in accordance with short-time principle component analysis.

3. The video content generation system according to claim 2 further comprising a weight calculation unit which calculates a weight based on a number of nodes subsequently connectable to each of nodes included in the motion graph that includes a plurality of nodes in frames with motion characteristics extracted from motion data and a plurality of edges each indicating concatenation between adjacent nodes.

4. The video content generation system according to claim 3, wherein the weight calculation unit discriminates a first type of nodes each subsequently connectible to multiple nodes and a second type of nodes each subsequently unconnected to any nodes, wherein the second type of nodes is further classified into a terminal node with no weight and an annexed node with a predetermined weight, and wherein a higher weight is applied to the first type of nodes.

5. The video content generation system according to claim 3, wherein the optimum path search unit searches the optimum path connecting between nodes with motion characteristics matching with musical characteristics of music data such that the weight of a last node is above a predetermined value.

6. The video content generation system according to claim 1, wherein when the first cost is higher than the second cost multiplied by a predetermined coefficient which is determined in advance, the optimum path search unit searches the new optimum path based on the predetermined amount of music data stored in the music data storage unit, alternatively, the optimum path search unit adds concatenation between the last node and the newly added node to the foregoing optimum path.

7. The video content generation system according to claim 1 further comprising a transposition determination unit which analyzes musical characteristics from music data stored in the music data storage unit so as to determine a beat count representing the predetermined number of beats, wherein the transposition determination unit increases the beat count in response to a change of a musical phase or a climax of the musical tune based on music data stored in the music data storage unit, alternatively, the transposition determination unit sets the beat count to one.

8. A video content generation device comprising:

a capture unit which captures a motion graph including nodes, edges, and weights, which are calculated based on motion characteristics extracted from motion data, as well as metadata indicating a synchronization probability for each node between the motion graph and a musical tune used to generate video content;

a music data storage unit which retrieves a predetermined number of beats, each having a plurality of nodes, from the musical tune so as to store a predetermined amount of music data with their musical features;

an optimum path search unit that searches an optimum path connecting between nodes, each of which is selected for each beat with a high synchronization probability, on the motion graph with motion characteristics matching musical characteristics based on the predetermined amount of music data by way of a dynamic programming update method;

a synchronization unit which generates synchronization information used to correlate music data to motion data along with the optimum path; and a video data generation unit which generates video data synchronized with music data based on the synchronization information, thus simultaneously reproducing video data and music data wherein when the music data storage unit newly stores the predetermined number of beats of music data, the optimum path search unit searches a new optimum path in response to a ratio between a first cost, calculated between a last node of a previous optimum path and a newly added node representing one of the plurality of nodes for each node included in the newly stored music data, and a second cost calculated between a candidate node associated to the last node of the previous optimum path and the newly added node, and wherein the new optimum path is made by adding concatenation between the last node and the newly added node to the foregoing optimum path.

9. The video content generation device according to claim 8 further comprising a music analysis unit which retrieves musical characteristics from the predetermined amount of music data stored in the music data storage unit in accordance with short-time principle component analysis.

10. The video content generation device according to claim 8, wherein the capture unit calculates a weight based on a number of nodes subsequently connectable to each of nodes included in the motion graph that includes a plurality of nodes in frames with motion characteristics extracted from motion data and a plurality of edges each indicating concatenation between adjacent nodes, and wherein the optimum path search unit searches the optimum path connecting between nodes with motion characteristics matching musical characteristics of music data on the motion graph such that the weight of the last node is above a predetermined value.

11. The video content generation according to claim 8, wherein when the first cost is higher than the second cost multiplied by a predetermined coefficient which is determined in advance, the optimum path search unit searches the new optimum path based on the predetermined amount of music data stored in the music data storage unit, alternatively, the optimum path search unit adds concatenation between the last node and the newly added node to the foregoing optimum path.

12. The video content generation device according to claim 8 further comprising a transposition determination unit which analyzes musical characteristics from music data stored in the music data storage unit so as to determine a beat count corresponding to the predetermined number of beats, wherein the transposition determination unit increases the beat count in response to a change of a musical phase or a climax of the musical tune based on music data stored in the music data storage unit, alternatively, the transposition determination unit sets the beat count to one.

13. A non-transitory computer-readable storage medium, storing one or more programs for implementation by a computer, a video content generation method comprising:
 capturing a motion graph including nodes, edges, and weights, which are calculated based on motion characteristics extracted from motion data, as well as metadata indicating a synchronization probability for each node between the motion graph and a musical tune used to generate video content;
 retrieving a predetermined number of beats, each having a plurality of nodes, from the musical tune so as to store a predetermined amount of music data with their musical features;
 searching an optimum path connecting between nodes, each of which is selected for each beat with a high synchronization probability, on the motion graph with motion characteristics matching musical characteristics based on the predetermined amount of music data by way of a dynamic programming update method;
 generating synchronization information used to correlate music data to motion data along with the optimum path; and
 generating video data synchronized with music data based on the synchronization information, thus simultaneously reproducing video data and music data,
 wherein upon newly storing the predetermined number of beats of music data, a new optimum path is searched in response to a ratio between a first cost, calculated between a last node of a previous optimum path and a newly added node representing one of the plurality of nodes included in the newly stored music data, and a second cost calculated between a candidate node associated to of the last node of the previous optimum path and the newly added node, and
 wherein the new optimum path is made by adding concatenation between the last node and the newly added node to the foregoing optimum path.

14. The non-transitory computer-readable storage medium, storing one or more programs for implementation by a computer, a video content generation method according to claim 13 further comprising:
 retrieving musical characteristics from the predetermined amount of music data in accordance with short-time principle component analysis.

15. The non-transitory computer-readable storage medium, storing one or more programs for implementation by a computer, a video content generation method according to claim 13 further comprising:
 calculating a weight based on a number of nodes subsequently connectible to each of nodes included in the motion graph that includes a plurality of nodes in frames with motion characteristics extracted from motion data and a plurality of edges each indicating concatenation between adjacent nodes; and
 searching the optimum path connecting between nodes with motion characteristics matching musical characteristics of music data on the motion graph such that the weight of the last node is above a predetermined value.

* * * * *